(12) United States Patent
Zhou et al.

(10) Patent No.: US 12,158,642 B2
(45) Date of Patent: Dec. 3, 2024

(54) DISPLAY PANEL AND DISPLAY APPARATUS

(71) Applicant: Xiamen Tianma Micro-Electronics Co.,Ltd., Xiamen (CN)

(72) Inventors: Wenqi Zhou, Xiamen (CN); Yan Yang, Xiamen (CN); Ting Zhou, Xiamen (CN); Junyi Li, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 18/229,460

(22) Filed: Aug. 2, 2023

(65) Prior Publication Data

US 2023/0375864 A1 Nov. 23, 2023

Related U.S. Application Data

(63) Continuation of application No. 17/673,380, filed on Feb. 16, 2022, now Pat. No. 11,747,661.

(30) Foreign Application Priority Data

Dec. 31, 2021 (CN) .......................... 202111670526.7

(51) Int. Cl.
*G02F 1/13* (2006.01)
*G02F 1/1335* (2006.01)

(52) U.S. Cl.
CPC ...... *G02F 1/1323* (2013.01); *G02F 1/133512* (2013.01); *G02F 1/133514* (2013.01)

(58) Field of Classification Search
None
See application file for complete search history.

(56) References Cited

U.S. PATENT DOCUMENTS

| | | | |
|---|---|---|---|
| 11,237,439 B1* | 2/2022 | Huang | G02F 1/1323 |
| 11,747,661 B2* | 9/2023 | Zhou | G02F 1/133512 |
| | | | 349/106 |
| 2008/0007684 A1* | 1/2008 | Kim | G02F 1/134363 |
| | | | 349/143 |

(Continued)

FOREIGN PATENT DOCUMENTS

| | | |
|---|---|---|
| CN | 103499898 A | 1/2014 |
| CN | 108549166 A | 9/2018 |
| CN | 110208970 A | 9/2019 |

*Primary Examiner* — Shan Liu
(74) *Attorney, Agent, or Firm* — Anova Law Group, PLLC

(57) ABSTRACT

A display panel includes a plurality of pixel units. At least one pixel unit includes a display region and an anti-peep region. The anti-peep region includes a first light-blocking layer and a second light-blocking layer. The first light-blocking layer is on a side of the second light-blocking layer facing a light-exiting surface of the display panel. Along a direction perpendicular to the light-exiting surface of the display panel, a distance between the first light-blocking layer and the second light-blocking layer is greater than zero. Along a fifth direction, the first light-blocking layer includes a plurality of first light-blocking strips and a plurality of first openings. A first opening is arranged between two neighboring first light-blocking strips. The fifth direction is parallel to the light-exiting surface of the display panel. Along the fifth direction, the second light-blocking layer includes a plurality of second light-blocking strips and a plurality of second openings.

18 Claims, 14 Drawing Sheets

(56) References Cited

U.S. PATENT DOCUMENTS

| | | | |
|---|---|---|---|
| 2008/0165297 A1* | 7/2008 | Matsushima | G02F 1/1323 |
| | | | 349/33 |
| 2013/0155034 A1 | 6/2013 | Nakayama et al. | |
| 2016/0085118 A1* | 3/2016 | Lee | G02F 1/134309 |
| | | | 445/24 |
| 2019/0086732 A1* | 3/2019 | Wang | G02F 1/13439 |
| 2019/0179197 A1* | 6/2019 | Li | G02F 1/133528 |
| 2019/0317343 A1* | 10/2019 | Li | G09G 3/36 |
| 2020/0142247 A1 | 5/2020 | Zhao et al. | |

* cited by examiner

DISPLAY PANEL AND DISPLAY APPARATUS

CROSS-REFERENCE TO RELATED APPLICATION

This application is a continuation of U.S. patent application Ser. No. 17/673,380, filed on Feb. 16, 2022, which claims the priority of Chinese Patent Application No. 202111670526.7, filed on Dec. 31, 2021, the content of which is incorporated herein by reference in its entirety.

TECHNICAL FIELD

The present disclosure generally relates to the field of display technology and, more particularly, relates to a display panel and a display apparatus.

BACKGROUND

Currently, people's requirements for information confidentiality become higher, which makes anti-peep display technology in various display technologies more important. For anti-peep display, the angle of the exiting light of the display screen may be limited to a certain range. Therefore, complete display pictures may only be viewed within a certain viewing angle range; and outside such viewing angle range, display pictures may not be observed, or distorted display pictures may be observed, thereby ensuring the security of the display user's information.

Two main types of anti-peep technologies may include on-state anti-peep technology and off-state anti-peep technology. For the on-state anti-peep technology, a vertical electric field may be increased, such that the liquid crystal may be tilted up, the light leakage in the dark-state of the large viewing angle may increase, and the contrast ratio may decrease rapidly, thereby realizing the anti-peep effect. However, the introduction of the vertical electric field may likely interfere the in-plane electric field of normal display, resulting in poor visual effect. For the off-state anti-peep technology, the anti-peep film and light modulation film may be added to the backlight to realize the anti-peep effect. However, the thickness of the anti-peep film and the light switchable t film may be relatively large, which may easily result in the problem of low transparency rate and high cost.

Therefore, there is a need to develop a display panel and a display apparatus, which may achieve anti-peep effect without affecting the normal display of the display panel.

SUMMARY

One aspect of the present disclosure provides a display panel. The display panel includes a plurality of pixel units. At least one pixel unit includes a display region and an anti-peep region. The anti-peep region includes a first light-blocking layer and a second light-blocking layer. The first light-blocking layer is on a side of the second light-blocking layer facing a light-exiting surface of the display panel. Along a direction perpendicular to the light-exiting surface of the display panel, a distance between the first light-blocking layer and the second light-blocking layer is greater than zero. Along a fifth direction, the first light-blocking layer includes a plurality of first light-blocking strips and a plurality of first openings. A first opening is arranged between two neighboring first light-blocking strips. The fifth direction is parallel to the light-exiting surface of the display panel. Along the fifth direction, the second light-blocking layer includes a plurality of second light-blocking strips and a plurality of second openings. A second opening is arranged between two neighboring second light-blocking strips. A vertical projection of the second opening on the light-exiting surface of the display panel is within a vertical projection of a corresponding first light-blocking strip on the light-exiting surface of the display panel. A vertical projection of the first opening on the light-exiting surface of the display panel is within a vertical projection of a corresponding second light-blocking strip on the light-exiting surface of the display panel.

Another aspect of the present disclosure provides a display apparatus including a display panel. The display panel includes a plurality of pixel units. At least one pixel unit includes a display region and an anti-peep region. The anti-peep region includes a first light-blocking layer and a second light-blocking layer. The first light-blocking layer is on a side of the second light-blocking layer facing a light-exiting surface of the display panel. Along a direction perpendicular to the light-exiting surface of the display panel, a distance between the first light-blocking layer and the second light-blocking layer is greater than zero. Along a fifth direction, the first light-blocking layer includes a plurality of first light-blocking strips and a plurality of first openings. A first opening is arranged between two neighboring first light-blocking strips. The fifth direction is parallel to the light-exiting surface of the display panel. Along the fifth direction, the second light-blocking layer includes a plurality of second light-blocking strips and a plurality of second openings. A second opening is arranged between two neighboring second light-blocking strips. A vertical projection of the second opening on the light-exiting surface of the display panel is within a vertical projection of a corresponding first light-blocking strip on the light-exiting surface of the display panel. A vertical projection of the first opening on the light-exiting surface of the display panel is within a vertical projection of a corresponding second light-blocking strip on the light-exiting surface of the display panel.

Other aspects of the present disclosure can be understood by those skilled in the art in light of the description, the claims, and the drawings of the present disclosure.

BRIEF DESCRIPTION OF THE DRAWINGS

The accompanying drawings, which are incorporated in and constitute a part of the specification, illustrate embodiments of the present disclosure and together with the description to describe the principles of the present disclosure.

DETAILED DESCRIPTION

Figure 1:
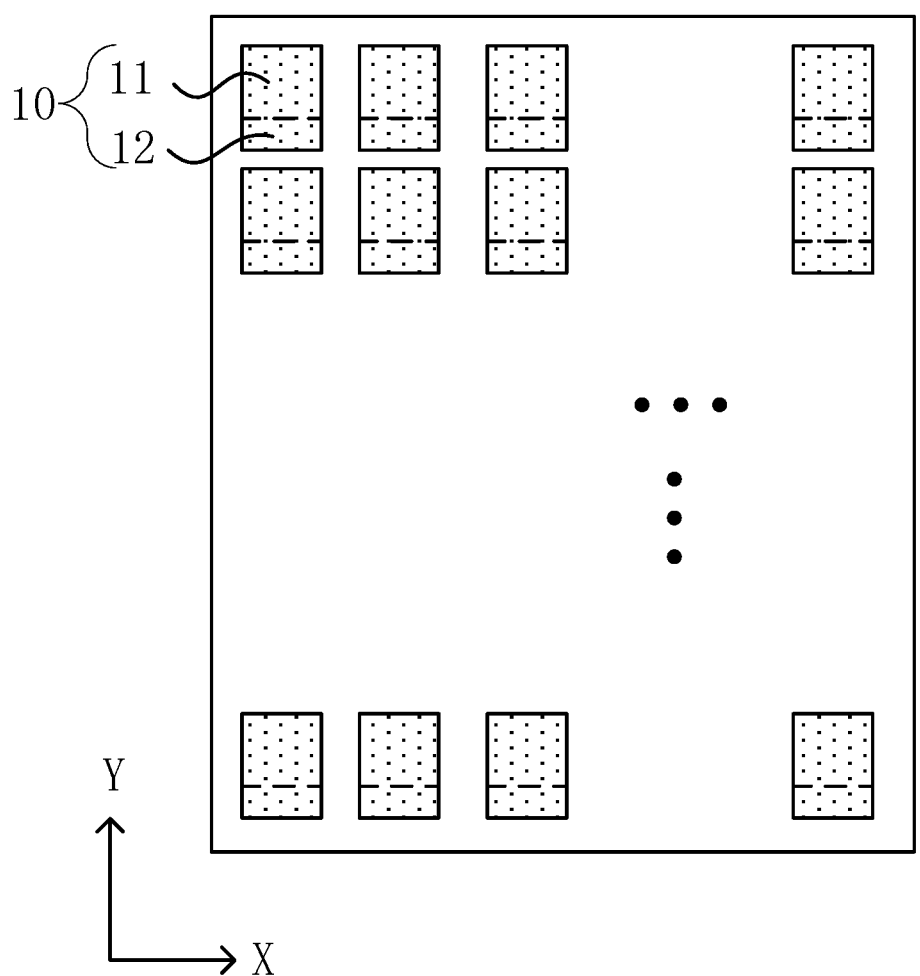
FIG. 1 illustrates a planar schematic of an exemplary display panel according to various embodiments of the present disclosure.

Various exemplary embodiments of the present disclosure are be described in detail with reference to the accompanying drawings. It should be noted that unless specifically stated otherwise, the relative arrangement of components and steps, numerical expressions and numerical values described in these embodiments may not limit the scope of the present disclosure.

The following description of at least one exemplary embodiment may be merely illustrative and may not be used to limit the present disclosure and its application or use.

The technologies, methods, and equipment known to those skilled in the art may not be discussed in detail, but where appropriate, the technologies, methods, and equipment should be regarded as a part of the present disclosure.

In all examples shown and discussed herein, any specific value should be interpreted as merely exemplary, rather than as a limitation. Therefore, other examples of the exemplary embodiment may have different values.

It should be noted that similar reference numerals and letters indicate similar items in the following drawings. Therefore, once an item is defined in one drawing, it does not need to be further discussed in the subsequent drawings.

Figure 2:
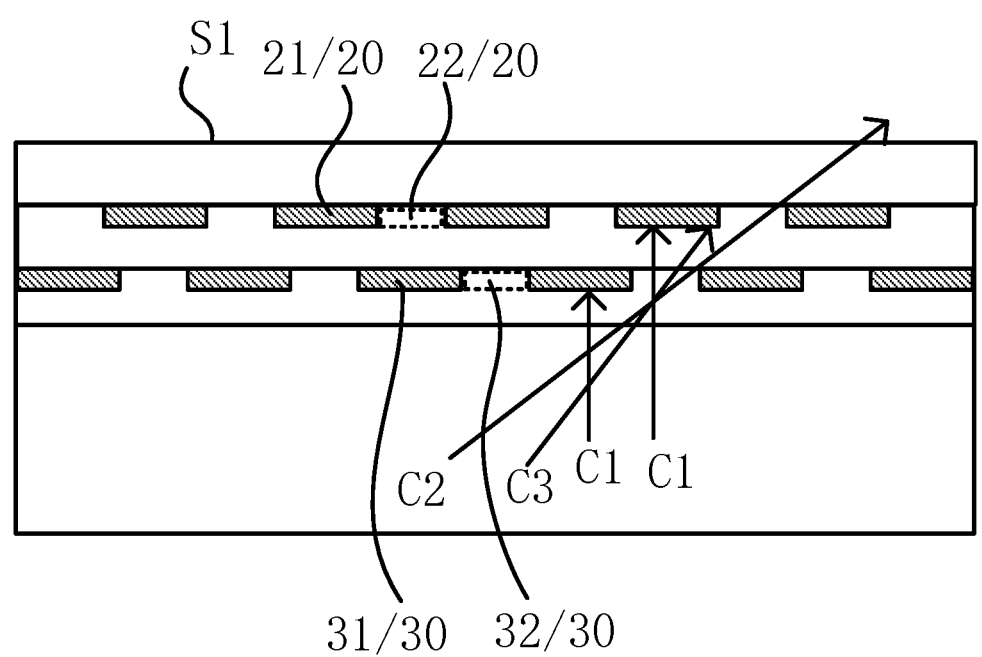
FIG. 2 illustrates a structural schematic of an anti-peep region in a pixel unit according to various embodiments of the present disclosure.

FIG. 1 illustrates a planar schematic of an exemplary display panel according to various embodiments of the present disclosure; and FIG. 2 illustrates a structural schematic of an anti-peep region in a pixel unit according to various embodiments of the present disclosure. Referring to FIGS. 1 and 2, a display panel is provided in one embodiment. The display panel may include a plurality of pixel units 10 arranged in an array along the first direction X and the second direction Y, where the first direction X may intersect the second direction Y. Optionally, the first direction X may be perpendicular to the second direction Y.

In the display panel, at least one pixel unit 10 may include a display region 11 and an anti-peep region 12. The light of the display region 11 in the pixel unit 10 may normally exit, thereby realizing the image display on the display panel. It should be noted that, FIG. 1 exemplarily shows all pixel units 10 may include the display regions 11 and the anti-peep regions 12; in other embodiments of the present disclosure, only a part of the pixel units 10 may include the display regions 11 and the anti-peep regions 12, or a part of the pixel units 10 may only include the display regions 11, or a part of pixel units 10 may only include the anti-peep regions 12, which may not be limited in the present disclosure.

In the display panel, at least one pixel unit 10 may include the anti-peep region 12. The display panel may realize anti-peep effect by disposing the anti-peep region 12 in the pixel unit 10.

For example, the anti-peep region 12 may include the first light-blocking layer 20 and the second light-blocking layer 30; the first light-blocking layer 20 may be on the side of the second light-blocking layer 30 facing the light-exiting surface S1 of the display panel; and along the direction perpendicular to the light-exiting surface S1 of the display panel, the distance between the first light-blocking layer 20 and the second light-blocking layer 30 may be greater than zero.

The first light-blocking layer 20 may include at least one first light-blocking strip 21 and at least one first opening 22; the second light-blocking layer 30 may include at least one second light-blocking strip 31 and at least one second opening 32; the vertical projection of the first opening 22 on the light-exiting surface S1 of the display panel may be within the vertical projection of the second light-blocking strip 31 on the light-exiting surface S1 of the display panel; and the vertical projection of the second opening 32 on the light-exiting surface S1 of the display panel may be within the vertical projection of the first light-blocking strip 21 on the light-exiting surface S1 of the display panel.

In the anti-peep region 12, when the front-viewing-angle light rays C1 exit toward the side of the light-exiting surface S1 of the display panel and pass the second light-blocking layer 30, a part of the front-viewing-angle light rays C1 may be blocked by the second light-blocking strip 31 and may not exit from the light-exiting surface S1 of the display panel, and the remaining part of the front-viewing-angle light rays C1 may pass the second opening 32 and exit toward the first light-blocking layer 20. Since the vertical projection of the second opening 32 on the light-exiting surface S1 of the display panel is within the vertical projection of the first light-blocking strip 21 on the light-exiting surface S1 of the display panel, the front-viewing-angle light rays C1 after passing the second opening 32 may be blocked by the first light-blocking strip 21 and may not exit from the light-exiting surface S1 of the display panel. That is, due to the arrangement of the first light-blocking layer 20 and the second light-blocking layer 30, the front-viewing-angle light rays C1 may not exit from the light-exiting surface S1 of the display panel. That is, the front-viewing-angle light rays may not be in the light rays exiting from the light-exiting surface S1 of the display panel in the anti-peep region 12. Since the human eye normally views the display panel from the front-viewing-angle direction, the light rays exiting from the light-exiting surface S1 of the display panel in the anti-peep region 12 may not affect the normal display effect.

In the anti-peep region 12, when the large-viewing-angle light rays C2 exit toward the side of the light-exiting surface S1 of the display panel and pass the second light-blocking layer 30, there may be a part of the large-viewing-angle light rays C2 passing the second opening 32 and exiting toward the first light-blocking layer 20. The distance between the first light-blocking layer 20 and the second light-blocking layer 30 along the direction perpendicular to the light-exiting surface S1 of the display panel is greater than 0, and the first light-blocking layer 20 includes at least one first opening 22. Therefore, there may be a part of the large-viewing-angle light rays C2 passing the first opening 22 and exiting from the light-exiting surface S1 of the display panel. That is, through the arrangement of the first light-blocking layer 20 and the second light-blocking layer 30, there may be a part of the large-viewing-angle light rays C2 exiting from the light-exiting surface S1 of the display panel. When a user at a large-viewing-angle position views the display panel, the user may receive the interference from the large-viewing-angle light rays from the anti-peep region 12, which may effectively reduce the contrast ratio. For example, optically, the contrast is defined as the ratio of full white brightness to full black brightness. Since there is a part of the large-viewing-angle light rays C2 exiting from the light-exiting surface S1 of the display panel, the full white brightness and full black brightness of the large viewing angle may increase. However, the increase of full black brightness may be greater than that of full white brightness. Therefore, according to the definition of contrast ratio, the contrast ratio may be reduced, thereby realizing the anti-peep effect.

The vertical projection of the first opening 22 on the light-exiting surface S1 of the display panel is within the vertical projection of the second light-blocking strip 31 on the light-exiting surface S1 of the display panel; and the vertical projection of the second opening 32 on the light-exiting surface S1 of the display panel is within the vertical projection of the first-blocking strip 21 on the light-exiting surface S1 of the display panel. Therefore, along the direction perpendicular to the light-exiting surface S1 of the display panel, the second light-blocking strip 31 and the first light-blocking strip 21 may be partially overlapped with each other, so that the small-viewing-angle light rays C3 may be also blocked by the first light-blocking strip 21. In such way, the light rays exiting from the light-exiting surface S1 of the display panel in the anti-peep region 12 may not affect the normal display effect.

Optionally, the first light-blocking layer 20 and the second light-blocking layer 30 may be made of black matrix materials. For example, the main components of conventional black matrix materials may include carbon black, dispersant, alkali-soluble resin (polymer), monomer, photo-initiator, additives, and the like. Conventional black matrix materials may also be referred to black matrix colloids (BM colloids). It can be understood that the materials of the black matrix in one embodiment may include, but may not be limited to, the above-mentioned materials, and may be other insulating and light-blocking materials during an implementation, which may not be described in detail in one embodiment. The low reflectivity of the black matrix material may prevent the external ambient light from being reflected on the first light-blocking layer 20 and the second light-blocking layer 30.

It should be noted that the front-viewing-angle light rays refer to the light rays exiting along the direction perpendicular to the light-exiting surface of the display panel, the large-viewing-angle light rays refer to the light rays with a relatively large angle between the light rays and the direction perpendicular to the light-exiting surface of the display panel, and the small-viewing-angle light rays refer to the light rays with a relatively small angle between the light rays and the direction perpendicular to the light-exiting surface of the display panel. Exemplarily, in the light rays exiting from the backlight surface of the display panel toward the light-exiting surface of the display panel, the light ray with an angle of more than 30° to the direction perpendicular to the light-exiting surface of the display panel is a large-viewing-angle light ray, and the light ray with an angle of less than 30° to the direction perpendicular to the light-exiting surface of the display panel is a small-viewing-angle light ray. Obviously, in other embodiments of the present disclosure, determination of the large-viewing-angle and the small-viewing-angle can also be determined based on other angles according to the angle between the light ray and the direction perpendicular to the light-exiting surface of the display panel, which may not be described in detail herein. In related embodiments of the present disclosure, related descriptions may also be applied, which may not be described in the present disclosure.

It should be noted that the front-viewing-angle direction is a direction perpendicular to the light-exiting surface of the display panel. In related embodiments of the present disclosure, related descriptions may also be applied, which may not be described in the present disclosure.

It should be noted that the display panel provided by the present disclosure may be a liquid crystal display panel, an organic light-emitting display panel, a micro light-emitting diode display panel, or other types of display panels, which may not be described in detail herein. When the display panel provided by the present disclosure is a liquid crystal display panel, the light rays exiting from the light-exiting surface of the display panel in the anti-peep region may be provided by a backlight module. When the display panel provided by the present disclosure is an organic light-emitting display panel or a micro light-emitting diode display panel, a light-emitting device may need to be disposed in the anti-peep region.

It should be noted that, FIG. 1 only exemplarily illustrates that the pixel units in the display panel may all include the anti-peep regions; and in other embodiments of the present disclosure, some pixel units in the display panel may not include the anti-peep regions, which may be configured according to actual production needs and may not be described in detail herein.

Figure 3:
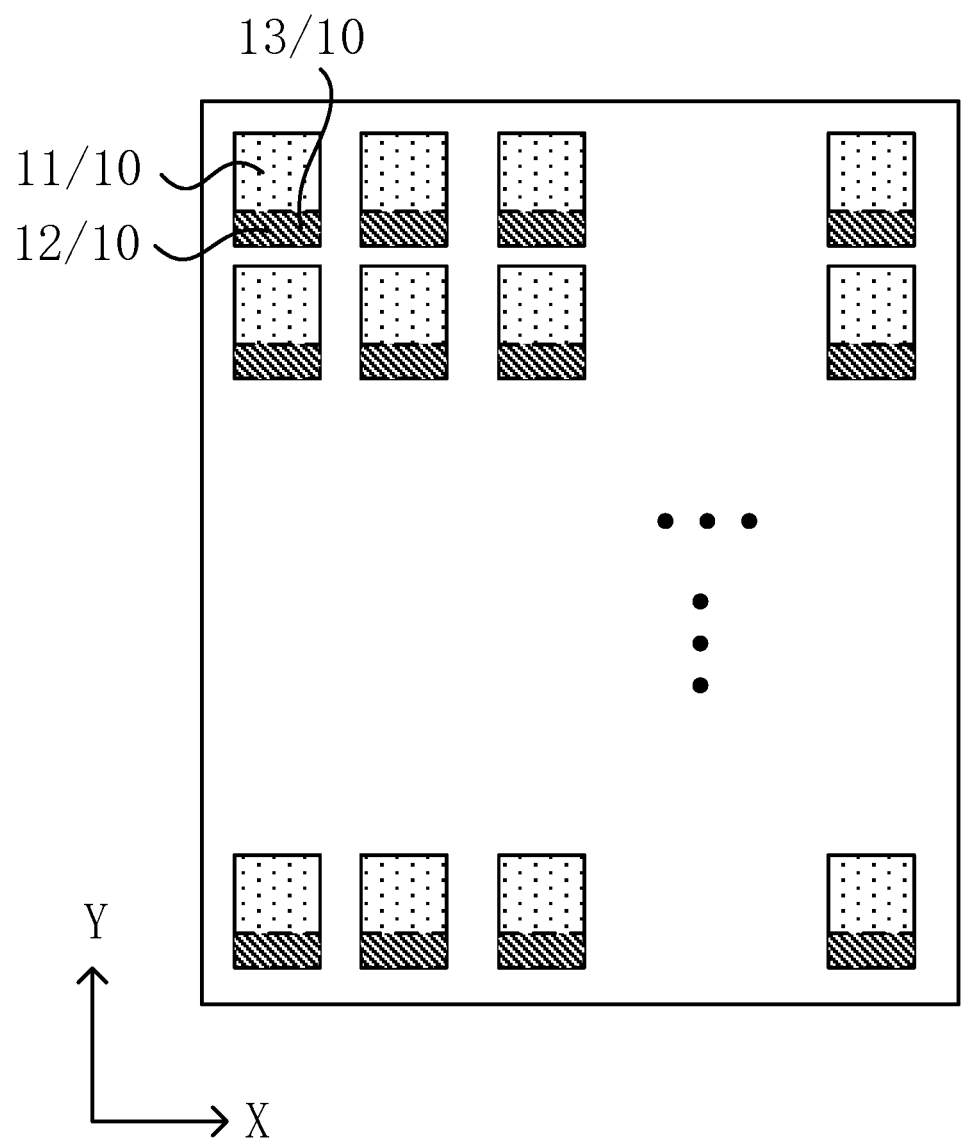
FIG. 3 illustrates another planar schematic of an exemplary display panel according to various embodiments of the present disclosure.

FIG. 3 illustrates another planar schematic of an exemplary display panel according to various embodiments of the present disclosure. Referring to FIG. 3, in some optional embodiments, the pixel unit 10 may include a color anti-peep pixel 13. The color anti-peep pixel 13 may emit non-white light rays such as red light rays, blue light rays or green light rays, and also may be in the anti-peep region 12. That is, the large-viewing-angle light rays exiting from the anti-peep region 12 may be non-white light rays such as red light rays, blue light rays, or green light rays, which may increase the interference when the user at the large-viewing-angle position views the display panel and effectively improve the anti-peep effect.

It should be noted that, when the display panel provided by the present disclosure is a liquid crystal display panel, a color color-resist may be disposed in the anti-peep region to realize the arrangement of the color anti-peep pixel in the anti-peep region. When the display panel provided by the present disclosure is an organic light-emitting display panel or a micro light-emitting diode display panel, a color light-emitting elements may be disposed in the anti-peep region to realize the arrangement of the color anti-peep pixel in the anti-peep region. Obviously, when the display panel provided by the present disclosure is an organic light-emitting display panel or a micro light-emitting diode display panel, a color light-emitting element may be disposed in the anti-peep region, and a color-resist may be disposed in the anti-peep region, thereby realizing the arrangement of the color anti-peep pixel in the anti-peep region.

In some optional embodiments, the color anti-peep pixel may include the first color-resist layer. The first color-resist layer may be at least partially within the first opening, and/or the first color-resist layer may be at least partially within the second opening.

Figure 4:
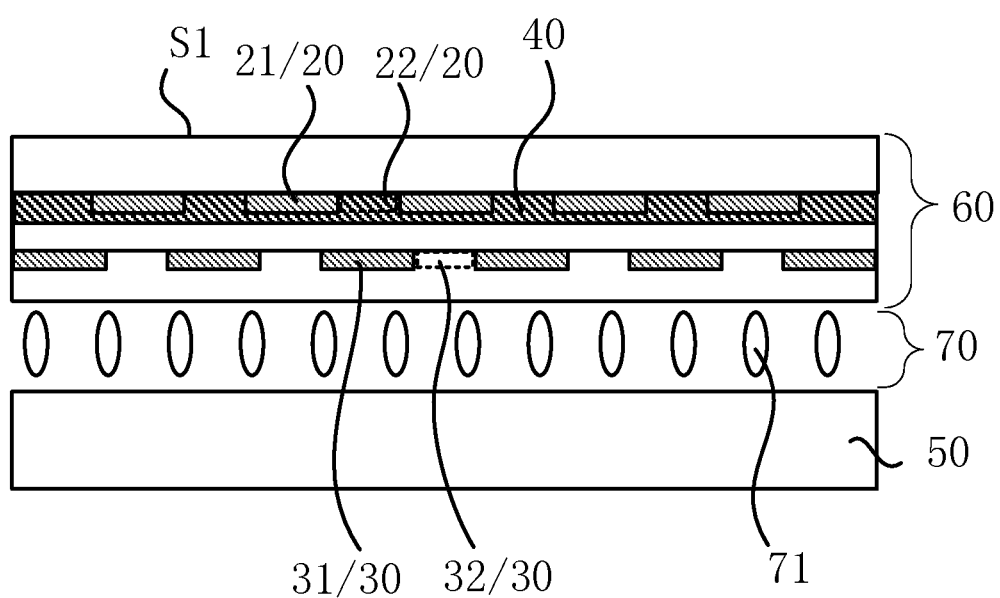
FIG. 4 illustrates a structural schematic of an anti-peep region in another pixel unit according to various embodiments of the present disclosure.

FIG. 4 illustrates a structural schematic of an anti-peep region in another pixel unit according to various embodiments of the present disclosure. Referring to FIGS. 3 and 4, the color anti-peep pixel 13 may include the first color-resist layer 40; the first color-resist layer 40 may be at least partially in the first opening 22; and the first color-resist layer 40 may include red color resists, blue color resists, green color resists, and the like. Therefore, the large-viewing-angle light rays exiting from the anti-peep region 12 may be non-white light rays such as red light rays, blue light rays, or green light rays.

It should be noted that FIG. 4 may only exemplarily illustrate that the first color-resist layer may be at least partially disposed in the first opening; in other embodiments of the present disclosure, the first color-resist layer may be at least partially disposed in the second opening, or the first color-resist layer may be at least partially disposed in both the first opening and the second opening, which may not be described in detail herein.

It should be noted that, FIG. 4 may exemplarily illustrate that the display panel is a liquid crystal display panel; and in other embodiments of the present disclosure, the display panel may also be an organic light-emitting display panel, a micro light-emitting diode display panel, or other types of display panels. When the display panel is an organic light-emitting display panel, a micro light-emitting diode display panel, or other types of display panels, the first color-resist layer may also be disposed in the color anti-peep pixel. The disposing manner of the first color-resist layer may refer to FIG. 4, which may not be described in detail in the present disclosure.

Referring to FIGS. 3-4, optionally, the display panel may further include color sub-pixels (not shown in FIGS. 3-4) in the display region 11. When the display panel is a liquid crystal display panel, the color sub-pixels may include the second color-resist layer (not shown in FIGS. 3-4). The first color-resist layer 40 and the second color-resist layer may be disposed at a same layer using a same process to simplify the formation process.

Figure 5:
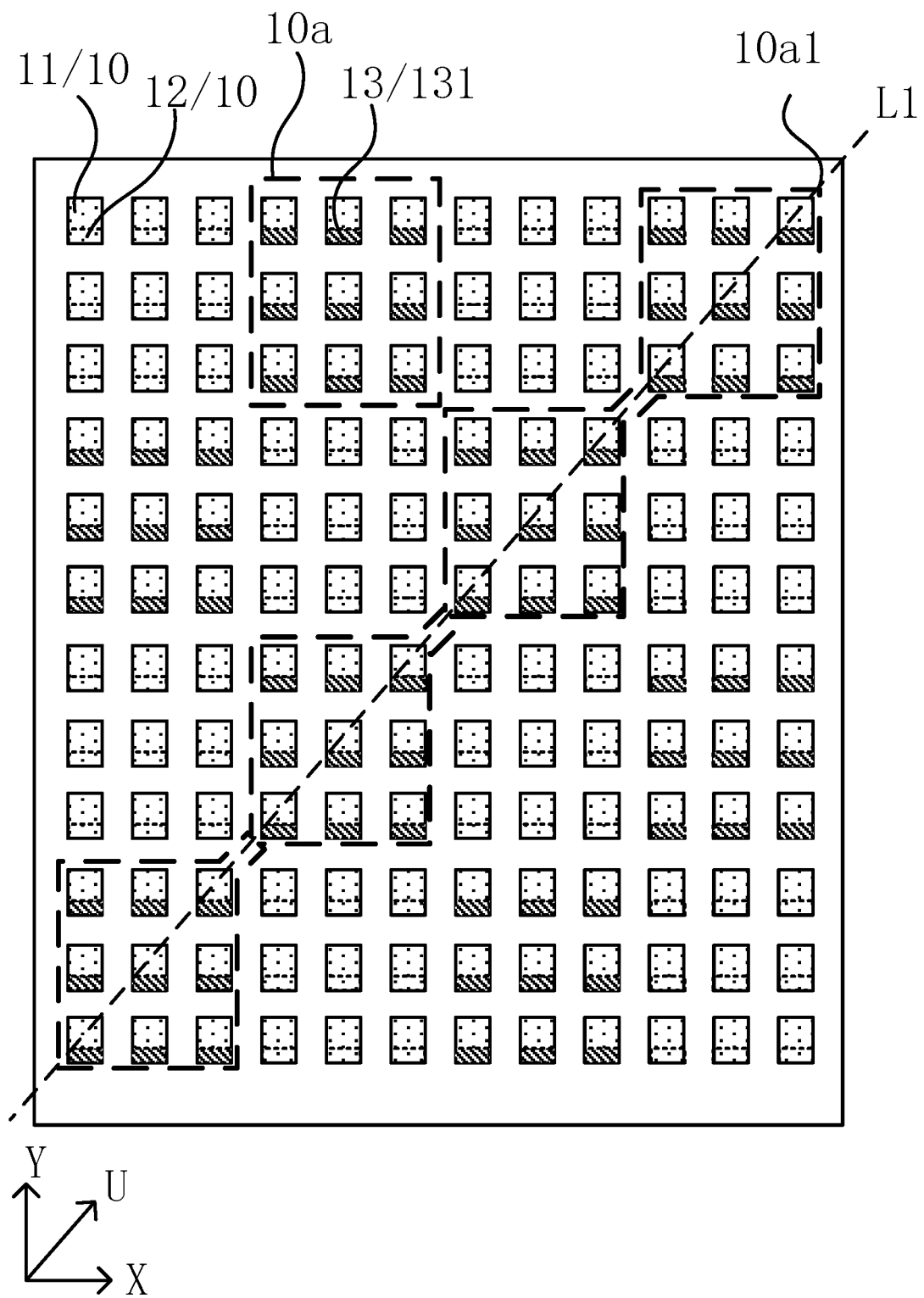
FIG. 5 illustrates another planar schematic of an exemplary display panel according to various embodiments of the present disclosure.

FIG. 5 illustrates another planar schematic of an exemplary display panel according to various embodiments of the present disclosure. Referring to FIG. 5, in some optional embodiments, the display panel may include at least one first pixel unit group 10a. The first pixel unit group 10a may include M1×N1 pixel units 10; and in the first pixel unit group 10a, the color anti-peep pixels 13 may all be first-color anti-peep pixels 131, where M1 and N1 are both positive integers.

At least one first pixel unit group 10a may be disposed in the display panel; and in the pixel units 10 in the first pixel unit group 10a, the color anti-peep pixels 13 in the anti-peep regions 12 may all be the first-color anti-peep pixels 131, thereby increasing the interference when the user at the large-viewing-angle position views the display panel and effectively improving the anti-peep effect.

Optionally, the first-color anti-peep pixels 131 may be red anti-peep pixels, blue anti-peep pixels, or green anti-peep pixels.

Referring to FIG. 5, in some optional embodiments, $3 \leq M1 \leq 30$, and $3 \leq N1 \leq 30$.

When $3 \leq M1$ and $3 \leq N1$ and the user at the large-viewing-angle position views the display panel, in the pixel units 10 in the first pixel unit group 10a, the light rays exiting from the anti-peep regions 12 may form a nearly block structure which may effectively improve the interference effect, thereby improving the anti-peep effect.

When $M1 \leq 30$ and $N1 \leq 30$, it may avoid that when the user at the large-viewing-angle position views the display panel, the light rays exiting from the anti-peep regions 12 in the pixel units 10 with a larger area may be a same color. When the display content of the display panel is text, the area of one character may be greater than or equal to 1 mm$^2$ (when the area of one single character is less than 1 mm$^2$, it is difficult for human eyes to recognize the character). For viewing comfort, the area of one character is usually 9-36 mm$^2$, and the area of one pixel unit 10 is usually less than 0.04 mm$^2$. Therefore, one character may include at least 25 pixel units 10. When one character is covered by color anti-peep pixels 13 of different colors, the human eyes may be more likely to be attracted by the color blocks including color anti-peep pixels 13 of different colors, which may be beneficial for improving the anti-peep effect. When the display panel displays text, the contrast ratio may be large, so that it may be more difficult for anti-peeping. Therefore, when $3 \leq M1 \leq 30$ and $3 \leq N1 \leq 30$, in the pixel units 10 of the first pixel unit group 10a, the light rays exiting from the anti-peep regions 12 may form a nearly block structure to cover the display content. Optionally, when some pixel units 10 are not disposed with color anti-peep pixels 13, white and first-color color blocks may be formed under a large viewing angle; and color blocks of different colors may be frequently changed to attract human eyes, which may be beneficial for improving the anti-peep effect of the display panel.

It should be noted that, FIG. 5 may exemplarily illustrate that the first pixel unit group 10a may include 3×3 pixel units 10; and in other embodiments of the present disclosure, M1 and N1 may also be other values, and M1 and N1 may be same or different, which may not be described in detail herein.

Referring to FIG. 5, in some optional embodiments, the display panel may include a plurality of first pixel unit group columns 10a1.

The first pixel unit group column 10a1 may include a plurality of first pixel unit groups 10a arranged along the third direction U, where the third direction U may intersect the first direction X, and the third direction U may intersect the second direction Y. When the user at the large-viewing-angle position views the display panel, in the first pixel unit groups 10a of the first pixel unit group column 10a1, the light rays exiting from the anti-peep regions 12 may form a strip structure extending along the third direction U. If the display panel includes the plurality of first pixel unit group columns 10a1, the twill display effect may be shown when the user at the large-viewing-angle position views the display panel. Since human eyes are more sensitive to the twill, the interference effect may be effectively improved, and the anti-peep effect may be improved.

It should be noted that, to clearly illustrate the structure of the first pixel unit group column 10a1 in FIG. 5, a reference line L1 is shown in FIG. 5. The reference line L1 may extend along the third direction U, and the first pixel unit groups 10a corresponding to the reference line L1 may be in a same first pixel unit group column 10a1. FIG. 5 only exemplarily illustrates one first pixel unit group column 10a1; and the first pixel unit group column 10a1 may include four first pixel unit groups 10a. In other embodiments of the present disclosure, the first pixel unit group column 10a1 may further include other numbers of first pixel unit groups 10a, which may not be described in detail herein. Meanwhile, it should be noted that the reference line L1 in FIG. 5 is only used to illustrate the structure of the first pixel unit group column 10a1, and the display panel provided by the present disclosure may not have a linear structure same as the reference line L1 in an implementation. In related embodiments of the present disclosure, related descriptions may be applied, which may not be described in detail in the present disclosure.

Figure 6:
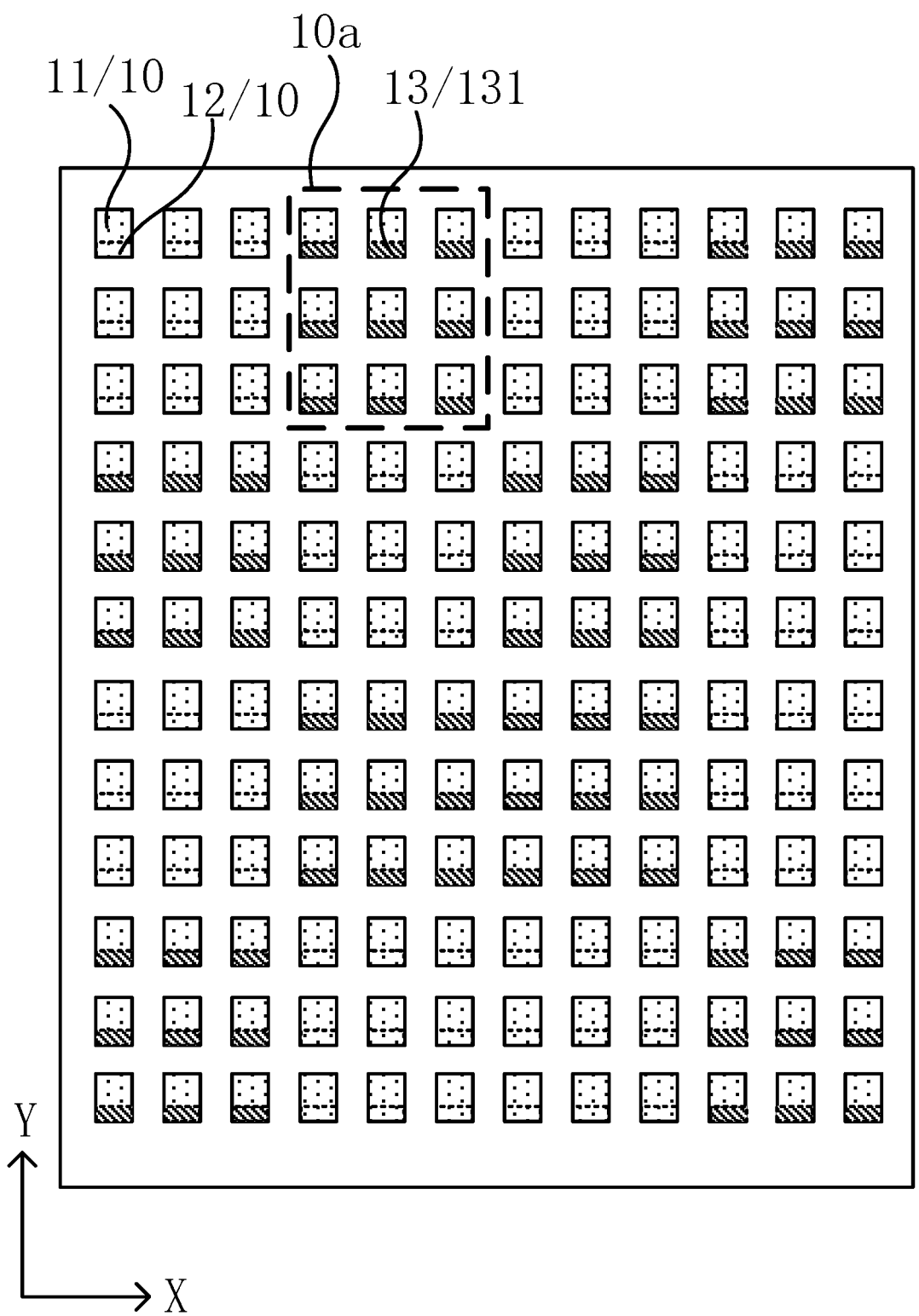
FIG. 6 illustrates another planar schematic of an exemplary display panel according to various embodiments of the present disclosure.

FIG. 6 illustrates another planar schematic of an exemplary display panel according to various embodiments of the present disclosure. Referring to FIG. 6, in some optional embodiments, the first pixel unit groups 10a may be randomly distributed in the display panel. When the user at the large-viewing-angle position views the display panel, the block structure formed by the light rays exiting from the anti-peep regions 12 in the pixel units 10 in the first pixel unit group 10a may be randomly distributed in the display panel, which may cause significant interference when the user at the large-viewing-angle position views the display panel and improve the anti-peep effect.

It should be noted that, in other embodiments of the present disclosure, other distribution manners of the first pixel unit groups 10a may also be used in the display panel, which may not be described in detail herein.

Figure 7:
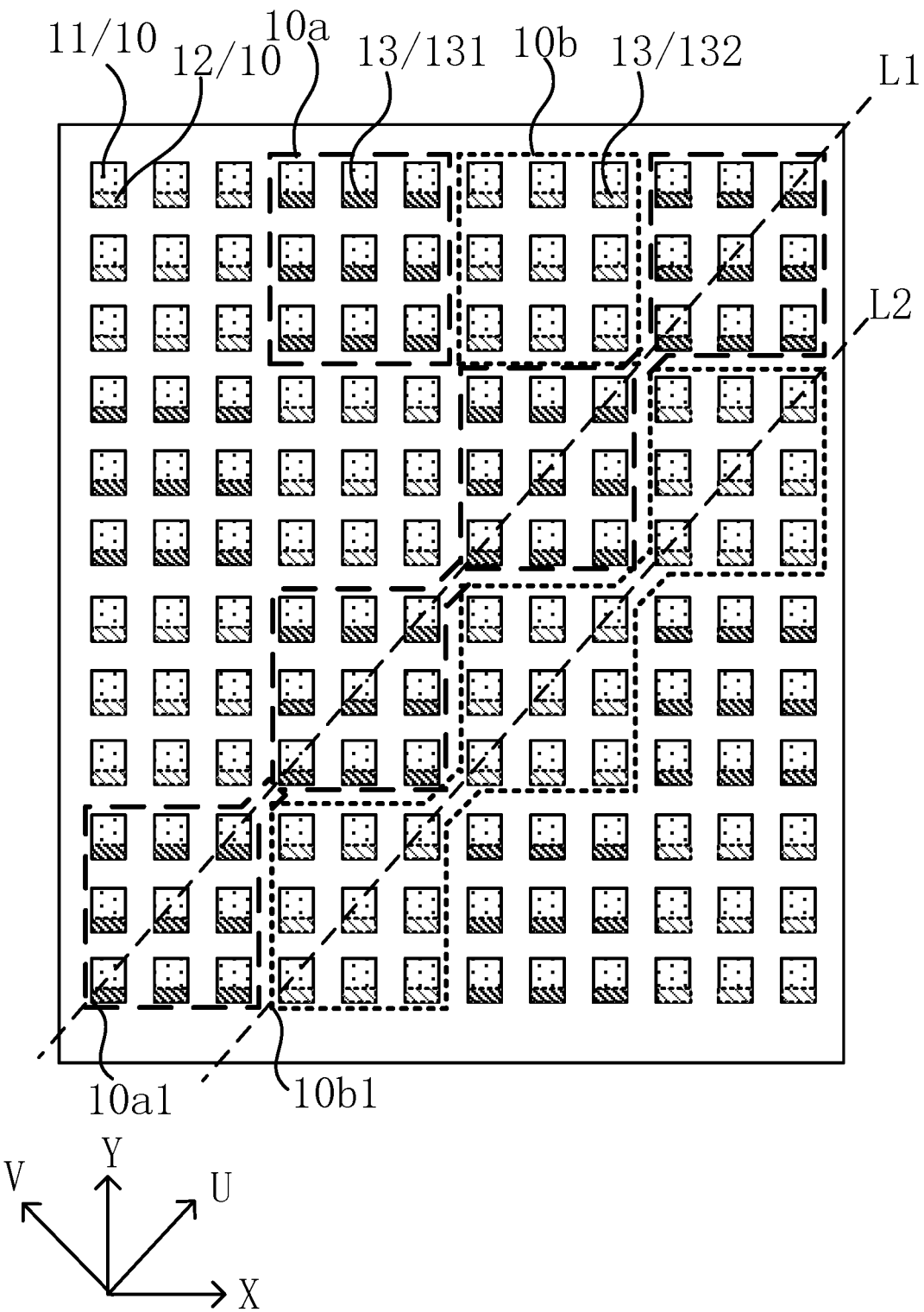
FIG. 7 illustrates another planar schematic of an exemplary display panel according to various embodiments of the present disclosure.

FIG. 7 illustrates another planar schematic of an exemplary display panel according to various embodiments of the present disclosure. Referring to FIG. 7, in some optional embodiments, the display panel may further include at least one second pixel unit group 10b. The second pixel unit group 10b may include M2×N2 pixel units 10; and in the second pixel unit group 10b, the color anti-peep pixels 13 may all be second-color anti-peep pixels 132, where M2 and N2 are both positive integers.

The first-color anti-peep pixels 131 and the second-color anti-peep pixels 132 may have different colors.

At least one second pixel unit group 10b may be configured in the display panel. In the pixel units 10 of the second pixel unit group 10b, the color anti-peep pixels 13 in the anti-peep regions 12 may all be the second-color anti-peep pixels 132. The first-color anti-peep pixels 131 and the second-color anti-peep pixels 132 may have different colors. More color anti-peep pixels 13 may be added to the display panel, which may further increase interference when the user at the large-viewing-angle position views the display panel and improve the anti-peep effect.

Optionally, when the first-color anti-peep pixels 131 are red anti-peep pixels, the second-color anti-peep pixels 132 may be blue anti-peep pixels or green anti-peep pixels. Similarly, when the first-color anti-peep pixels 131 are green anti-peep pixels, the second-color anti-peep pixels 132 may be red anti-peep pixels or blue anti-peep pixels; and when the first-color anti-peep pixels 131 are blue anti-peep pixels, the second-color anti-peep pixels 132 may be red anti-peep pixels or green anti-peep pixels.

Optionally, $3 \leq M2 \leq 30$, and $3 \leq N2 \leq 30$.

When $3 \leq M2$ and $3 \leq N2$ and the user at the large-viewing-angle position views the display panel, in the pixel units 10 of the second pixel unit group 10b, the light rays exiting from the anti-peep regions 12 may form a nearly block structure, which may effectively improve the interference effect, thereby improving the anti-peep effect.

When $M2 \leq 30$ and $N2 \leq 30$, it may avoid that when the user at the large-viewing-angle position views the display panel, the light rays exiting from the anti-peep regions 12 in the pixel units 10 with relatively large areas may have a same color. As mentioned above, when $3 \leq M1 \leq 30$, $3 \leq N1 \leq 30$, $3 \leq M2 \leq 30$, and $3 \leq N2 \leq 30$, in the pixel units 10 of the first pixel unit group 10a and the second pixel unit group 10b, the light rays exiting from the anti-peep regions 12 may form nearly block structures to cover the display content, and color blocks of different colors may be frequently changed to attract human eyes, which may be beneficial for improving the anti-peep effect of the display panel. Optionally, when some pixel units 10 are not disposed with color anti-peep pixels 13, the color blocks of the first-color, the second-color and the white color may be formed under a large viewing angle; and the color blocks of three colors may be frequently changed to attract human eyes, which may be beneficial for improving the anti-peep effect of the display panel.

It should be noted that FIG. 7 exemplarily illustrates that one second pixel unit group 10b may include 3×3 pixel units 10. In other embodiments of the present disclosure, M2 and N2 may also be other values, M2 and N2 may be same, M2 and N2 may also be different, M2 and M1 may be same, M2 and M1 may also be different, N2 and N1 may be same, and N2 and N1 may also be different, which may not be described in detail herein.

Referring to FIG. 7, in some optional embodiments, the display panel may include a plurality of first pixel unit group columns 10a1 and a plurality of second pixel unit group columns 10b 1.

The first pixel unit group column 10a1 may include a plurality of first pixel unit groups 10a arranged along the third direction U, and the second pixel unit group column 10b1 may include a plurality of second pixel unit groups 10b arranged along the third direction U, where the third direction U may intersect the first direction X, and the third direction U may intersect the second direction Y. When the user at the large-viewing-angle position views the display panel, in the first pixel unit groups 10a of the first pixel unit group column 10al, the light rays exiting from the anti-peep regions 12 may form a strip structure extending along the third direction U; and in the second pixel unit groups 10b of the second pixel unit group column 10b1, the light rays exiting from the anti-peep regions 12 may also form a strip structure extending along the third direction U.

Along the fourth direction V, at least a part of the first pixel unit group column 10a1 and the second pixel unit group column 10b1 may be spaced apart from each other, where the fourth direction V may be perpendicular to the third direction U. When the user at the large-viewing-angle position views the display panel, the twill interval display effect of different colors may be shown, which may further improve the interference effect and the anti-peep effect.

It should be noted that, to clearly illustrate the structures of the first pixel unit group column 10a1 and the second pixel unit group column 10b1 in FIG. 7, the reference line L1 and the reference line L2 are shown in FIG. 7. Both the reference line L1 and the reference line L2 extend along the third direction U. The first pixel unit groups 10a corresponding to the reference line L1 may be in a same first pixel unit group column 10a1, and the second pixel unit groups 10b corresponding to the reference line L2 may be in a same second pixel unit group column 10b1. FIG. 7 only exemplarily illustrates one first pixel unit group column 10a1 and one second pixel unit group column 10b1. The first pixel unit group column 10a1 may include four first pixel unit groups 10a, and the second pixel unit group column 10b1 may include three second pixel unit groups 10b. In other embodiments of the present disclosure, the first pixel unit group column 10a1 may further include other numbers of first pixel unit groups 10a, and the second pixel unit group column 10b1 may further include other numbers of second pixel unit groups 10b. The number of the first pixel unit groups 10a in the first pixel unit group column 10a1 and the number of the second pixel unit groups 10b in the second pixel unit group column 10b1 may be same or different, which may not be described in detail herein.

It should be noted that FIG. 7 only exemplarily illustrates that in the display panel, the first pixel unit group columns 10a1 and the second pixel unit group columns 10b1 may be sequentially spaced apart from each other. In other embodiments of the present disclosure, a part of the first pixel unit group columns 10a1 and second pixel unit group columns 10b1 in the display panel may not be sequentially spaced apart from each other, which may not be limited in the present disclosure.

Figure 8:
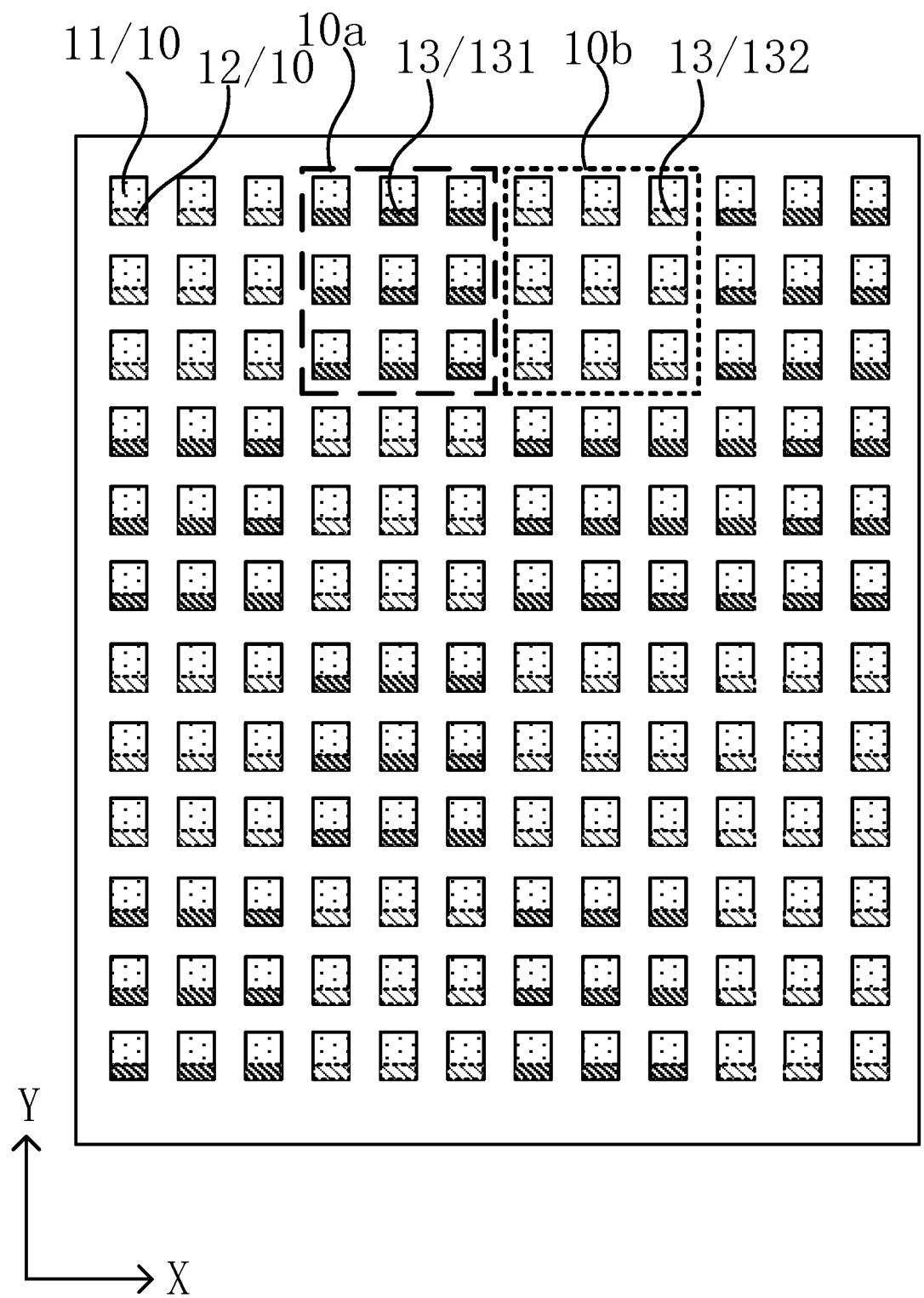
FIG. 8 illustrates another planar schematic of an exemplary display panel according to various embodiments of the present disclosure.

FIG. 8 illustrates another planar schematic of an exemplary display panel according to various embodiments of the present disclosure. Referring to FIG. 8, in some optional embodiments, the first pixel unit groups 10a and the second pixel unit groups 10b may be randomly distributed in the display panel. When the user at the large-viewing-angle position views the display panel, the block structure formed by the light rays exiting from the anti-peep regions 12 in the pixel units 10 of the first pixel unit group 10a and the block structure formed by the light rays exiting from the anti-peep regions 12 of the pixel units 10 of the second pixel unit group 10b may have different colors, and above-mentioned block structures may be randomly distributed in the display panel, which may further increase interference when the user at the large-viewing-angle position views the display panel and improve the anti-peep effect.

It should be noted that, in other embodiments of the present disclosure, other distribution manners of the first pixel unit groups 10a and the second pixel unit groups 10b may also be used in the display panel, which may not be described in detail herein.

Figure 9:
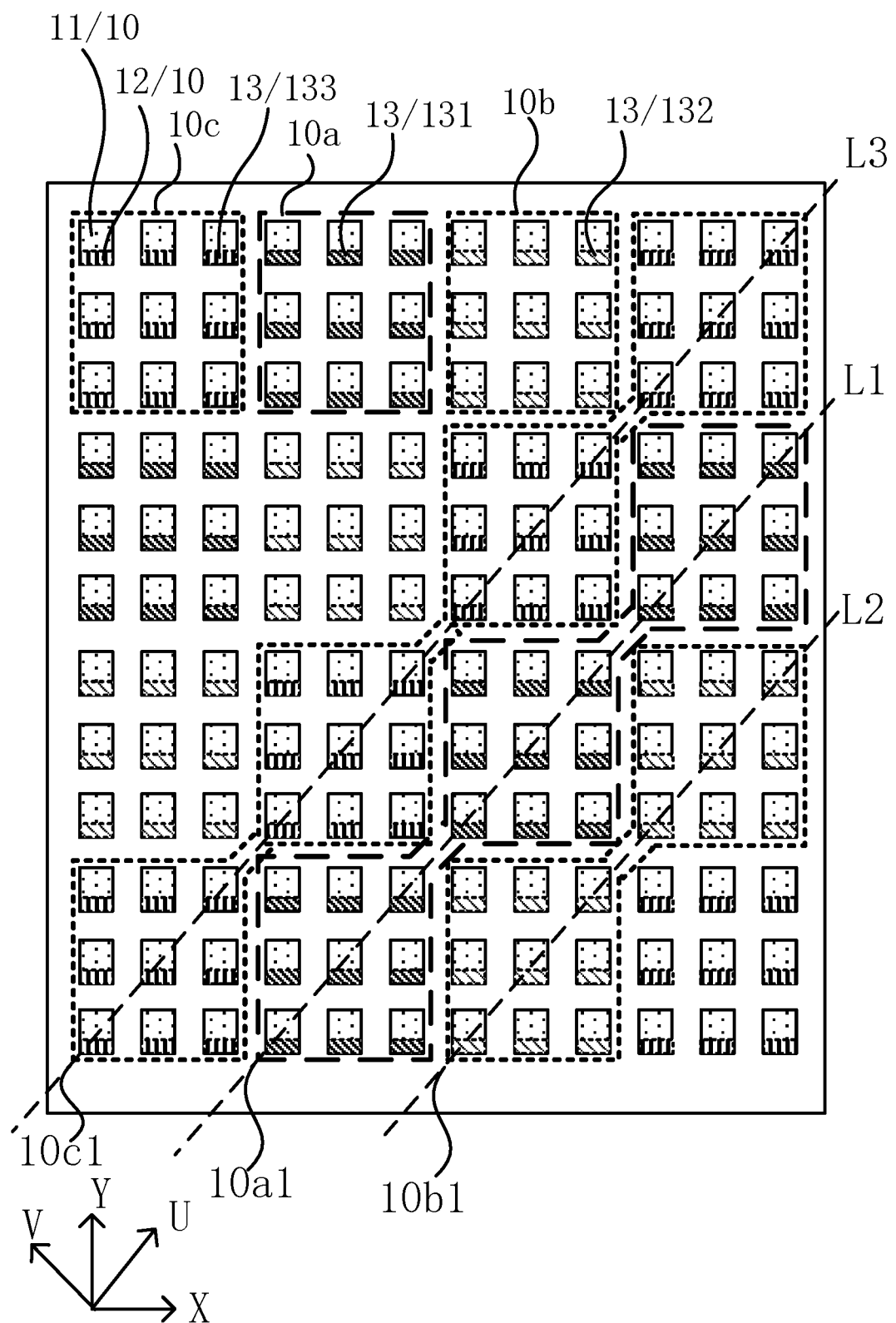
FIG. 9 illustrates another planar schematic of an exemplary display panel according to various embodiments of the present disclosure.

FIG. 9 illustrates another planar schematic of an exemplary display panel according to various embodiments of the present disclosure. Referring to FIG. 9, in some optional embodiments, the display panel may further include at least one third pixel unit group 10c. The third pixel unit group 10c may include M3×N3 pixel units 10. In the third pixel unit group 10c, the color anti-peep pixels 13 may all be the third-color anti-peep pixels 133, where M3 and N3 are both positive integers.

The first-color anti-peep pixels 131, the second-color anti-peep pixels 132, and the third-color anti-peep pixels 133 may all have different colors.

At least one third pixel unit group 10c may be configured in the display panel. In the pixel units 10 of the third pixel unit group 10c, the color anti-peep pixels 13 in the anti-peep regions 12 may all be the third-color anti-peep pixels 133. The first-color anti-peep pixels 131, the second-color anti-peep pixels 132 and the third-color anti-peep pixels 133 may all have different colors. More color anti-peep pixels 13 may be added to the display panel, which may further increase interference when the user at the large-viewing-angle position views the display panel and improve the anti-peep effect.

Optionally, the first-color anti-peep pixels 131 may be red anti-peep pixels, the second-color anti-peep pixels 132 may be blue anti-peep pixels, and the third-color anti-peep pixels 133 may be green anti-peep pixels.

Optionally, $3 \leq M1 \leq 30$, $3 \leq N1 \leq 30$, $3 \leq M2 \leq 30$, $3 \leq N2 \leq 30$, $3 \leq M3 \leq 30$, and $3 \leq N3 \leq 30$.

When $3 \leq M1$, $3 \leq N1$, $3 \leq M2$, $3 \leq N2$, $3 \leq M3$, and $3 \leq N3$ and the user at the large-viewing-angle position views the display panel, in the pixel units 10 in the third pixel unit group 10c, the light rays exiting from the anti-peep regions 12 may form a nearly block structure, which may effectively improve the interference effect, thereby improving the anti-peep effect.

When $M1 \leq 30$, $N1 \leq 30$, $M2 \leq 30$, $N2 \leq 30$, $M3 \leq 30$, and $N3 \leq 30$, it may avoid that, when the user at the large-viewing-angle position views the display panel, the light rays exiting from the anti-peep regions 12 in the pixel units 10 with relatively large areas may have a same color. As mentioned above, when $3 \leq M1 \leq 30$, $3 \leq N1 \leq 30$, $3 \leq M2 \leq 30$, $3 \leq N2 \leq 30$, $3 \leq M3 \leq 30$, and $3 \leq N3 \leq 30$, in the pixel units 10 of the first pixel unit group 10a, the second pixel unit group 10b and the third pixel unit group 10c, the light rays exiting from the anti-peep regions 12 may form nearly block structures to cover the display content, and color blocks of different colors may be frequently changed to attract human eyes, which may be beneficial for improving the anti-peep effect of the display panel. Optionally, when some pixel units 10 are not disposed with color anti-peep pixels 13, the color blocks of the first-color, the second-color, the third-color and the white color may be formed under a large viewing angle; and the color blocks of four colors may be frequently changed to attract human eyes, which may be beneficial for improving the anti-peep effect of the display panel.

It should be noted that, FIG. 9 exemplarily illustrates that the third pixel unit group 10c may include 3×3 pixel units 10. In other embodiments of the present disclosure, M3 and N3 may also be other values; M3 and N3 may be same or different; and M1, M2 and M3 may be same or different, which may not be described in detail herein.

Referring to FIG. 9, in some optional embodiments, the display panel may include the plurality of first pixel unit group columns 10a1, the plurality of second pixel unit group columns 10b1, and the plurality of third pixel unit group columns 10c1.

The first pixel unit group column 10a1 may include the plurality of first pixel unit groups 10a arranged along the third direction U; the second pixel unit group column 10b1 may include the plurality of second pixel unit groups 10b arranged along the third direction U; and the third pixel unit group column 10c1 may include the plurality of third pixel unit groups 10c arranged along the third direction U, where the third direction U may intersect the first direction X, and the third direction U may intersect the second direction Y. When the user at the large-viewing-angle position views the display panel, in the first pixel unit groups 10a of the first pixel unit group column 10a1, the light rays exiting from the anti-peep regions 12 may form a strip structure extending along the third direction U; in the second pixel unit groups 10b of the second pixel unit group column 10b1, the light rays exiting from the anti-peep regions 12 may also form a strip structure extending along the third direction U; in the third pixel unit groups 10c of the third pixel unit group column 10c1, the light rays exiting from the anti-peep regions 12 may also form a strip structure extending along the third direction U. In addition, the strip structures formed by the first pixel unit group column 10a1, the strip structure formed by the second pixel unit group column 10b1, and the strip structure formed by the third pixel unit group column 10c1 may have different colors.

Along the fourth direction V, at least two of the first pixel unit group column 10a1, the second pixel unit group column 10b1 and the third pixel unit group column 10c1 may be spaced apart from each other, where the fourth direction V may be perpendicular to the third direction U. When the user at the large-viewing-angle position views the display panel, the twill interval display effect of different colors may be shown, which may further improve the interference effect and the anti-peep effect.

It should be noted that, to clearly illustrate the structures of the first pixel unit group column 10a1, the second pixel unit group column 10b1 and the third pixel unit group column 10c1 in FIG. 9, the reference line L1, the reference line L2 and the reference line L3 are shown in FIG. 9. The reference line L1, the reference line L2 and the reference line L3 may all extend along the third direction U. The first pixel unit groups 10a corresponding to the reference line L1 may be in a same first pixel unit group column 10a1, the second pixel unit groups 10b corresponding to the reference line L2 may be in a same second pixel unit group column 10b1, and the third pixel unit groups 10c corresponding to the reference line L3 may be in a same third pixel unit group column 10c1. FIG. 9 may only exemplarily illustrate one first pixel unit group column 10a1, one second pixel unit group column 10b1 and one third pixel unit group column 10c1. The first pixel unit group column 10a1 may include three first pixel unit groups 10a, the second pixel unit group column 10b1 may include two second pixel unit groups 10b, and the third pixel unit group column 10c1 may include four second pixels unit group 10c. In other embodiments of the present disclosure, the first pixel unit group column 10a1 may further include other numbers of first pixel unit groups 10a, the second pixel unit group column 10b1 may further include other numbers of second pixel unit groups 10b, and the third pixel unit group column 10c1 may further include other numbers of third pixel unit groups 10c. The number of the first pixel unit groups 10a in the first pixel unit group column 10a1, the number of second pixel unit groups 10b in the second pixel unit group column 10b1, and the number of third pixel unit groups 10c in the third pixel unit group column 10c1 may be same or different, which may not be described in detail herein.

It should be noted that, FIG. 9 exemplarily illustrates that along the fourth direction V, the first pixel unit group column 10a1, the third pixel unit group column 10c1 and the second pixel unit group column 10b1 may be spaced apart from each other. Obviously, in other embodiments of the present disclosure, the first pixel unit group column 10a1, other arrangement manners of the second pixel unit group column 10b1, and the third pixel unit group column 10c1 may also be used, which may not be described in detail herein.

Figure 10:
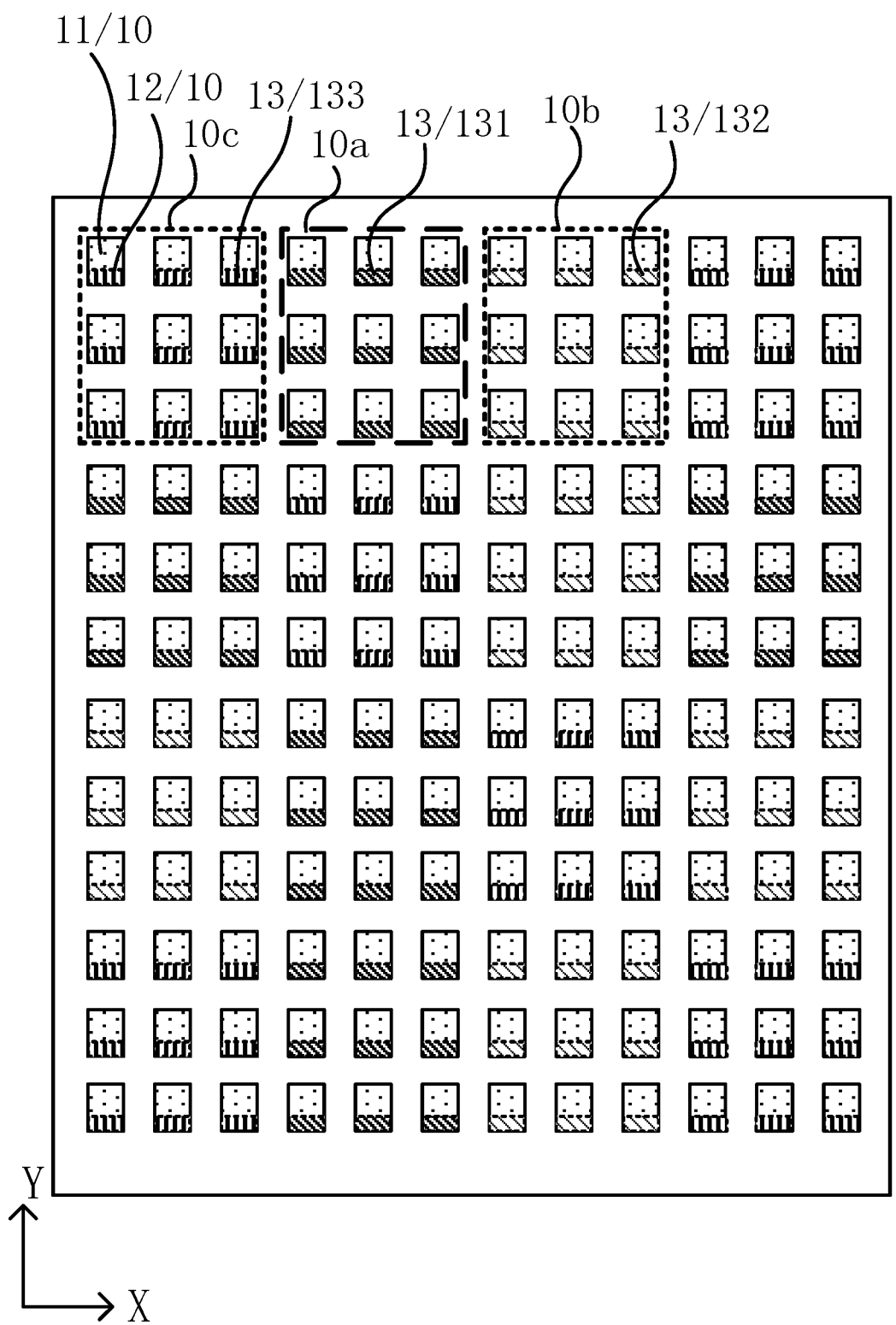
FIG. 10 illustrates another planar schematic of an exemplary display panel according to various embodiments of the present disclosure.

FIG. 10 illustrates another planar schematic of an exemplary display panel according to various embodiments of the present disclosure. Referring to FIG. 10, in some optional embodiments, the first pixel unit groups 10a, the second pixel unit groups 10b and the third pixel unit groups 10c may be randomly distributed in the display panel. When the user at the large-viewing-angle position views the display panel, the block structure formed by the light rays exiting from the anti-peep regions 12 in the pixel units 10 of the first pixel unit group 10a, the block structure formed by the light rays exiting from the anti-peep regions 12 of the pixel units 10 of the second pixel unit group 10b, and the block structure formed by the light rays exiting from the anti-peep regions 12 of the pixel units 10 of the third pixel unit group 10c may have different colors, and may be randomly distributed in the display panel, which may further increase interference when the user at the large-viewing-angle position views the display panel and improve the anti-peep effect.

It should be noted that, in other embodiments of the present disclosure, other arrangement manners in the display panel of the first pixel unit group 10a, the second pixel unit group 10b, and the third pixel unit group 10c may also be used, which may not be described in detail herein.

Referring to FIG. 2, in some optional embodiments, along the fifth direction W, the first light-blocking layer 20 may include the plurality of first light-blocking strips 21 and the plurality of first openings 22 which are arranged sequentially, one first opening 22 may be formed between two adjacent first light-blocking strips 21, and the fifth direction W may be in parallel with the light-exiting surface S1 of the display panel. It should be noted that FIG. 2 may exemplarily illustrate that the fifth direction W may be the first direction X; and in other embodiments of the present disclosure, the fifth direction W may also be the second direction Y or another direction, which may not be described in detail herein.

Along the fifth direction W, the second light-blocking layer 30 may include the plurality of second light-blocking strips 31 and the plurality of second openings 32 which are arranged sequentially; and one second opening 32 may be formed between two adjacent second light-blocking strips 31.

One first light-blocking strip 21 may correspond to one second opening 32; and the vertical projection of the second opening 32 on the light-exiting surface S1 of the display panel may be within the vertical projection of the corresponding first light-blocking strip 21 on the light-exiting surface S1 of the display panel. One second light-blocking strip 31 may correspond to one first opening 22; and the vertical projection of the first opening 22 on the light-exiting surface S1 of the display panel may be within the vertical projection of the corresponding second light-blocking strip 31 on the light-exiting surface S1 of the display panel. The first light-blocking strip 21 blocks the front-viewing-angle light rays C1 after passing the corresponding second opening 32, so that the front-viewing-angle light rays C1 may not exit from the light-exiting surface S1 of the display panel. That is, due to the arrangement of the first light-blocking layer 20 and the second light-blocking layer 30, the front-viewing-angle light rays C1 may not exit from the light-exiting surface S1 of the display panel. That also is, the front-viewing-angle light rays may not be in the light rays exiting from the light-exiting surface S1 of the display panel in the anti-peep regions 12. Since the human eye normally views the display panel from the front view direction, the light rays exiting from the light-exiting surface S1 of the display panel in the anti-peep region 12 may not affect the normal display effect.

There may be a part of the large-viewing-angle light rays C2 passing the first opening 22 and exiting from the light-exiting surface S1 of the display panel. That is, through the arrangement of the first light-blocking layer 20 and the second light-blocking layer 30, there may be a part of the large-viewing-angle light rays C2 exiting from the light-exiting surface S1 of the display panel. When the user at the large-viewing-angle position views the display panel, the user may receive interference from the large-viewing-angle light rays from the anti-peep regions 12, which may effectively reduce the contrast ratio and realize the anti-peep effect. In addition, the first light-blocking layer 20 includes the plurality of first openings 22, and the second light-blocking layer 30 includes the plurality of second openings 32, which may effectively increase the number of large-viewing-angle light rays exiting from the anti-peep region 12, effectively improve the interference effect and the anti-peep effect.

Figure 11:
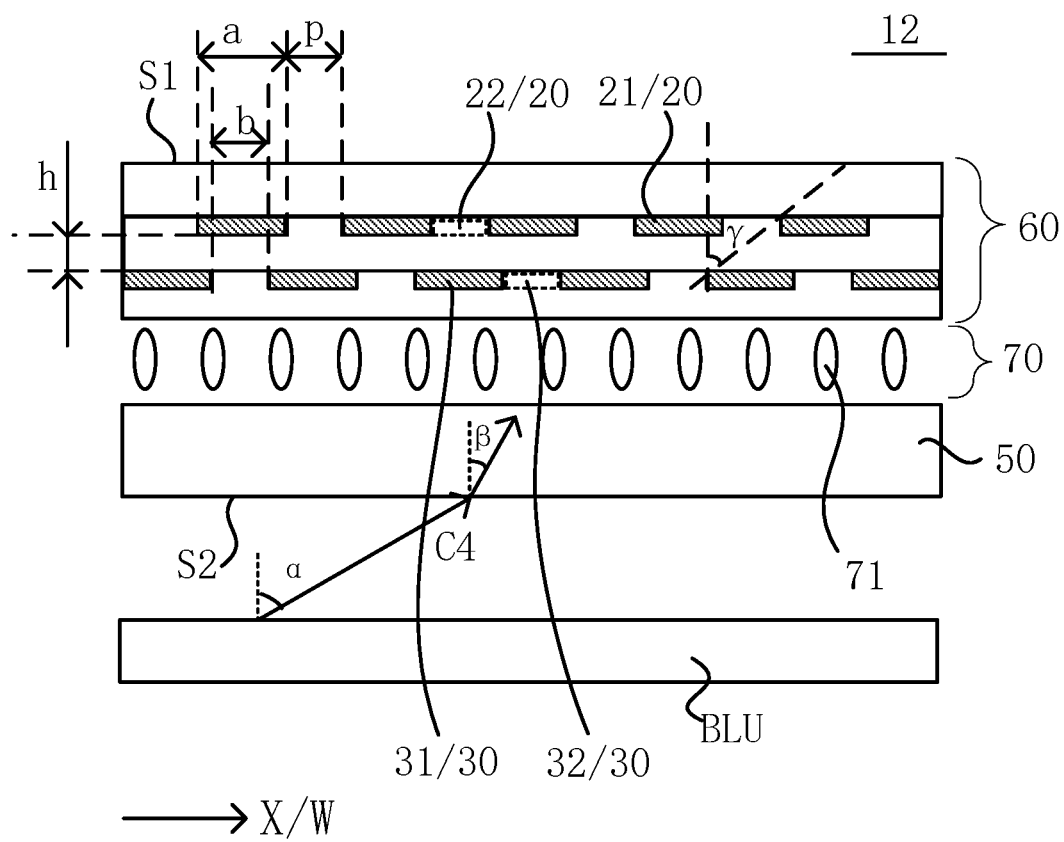
FIG. 11 illustrates a structural schematic of an anti-peep region in another pixel unit according to various embodiments of the present disclosure.

FIG. 11 illustrates a structural schematic of an anti-peep region in another pixel unit according to various embodiments of the present disclosure. Referring to FIG. 11, in some optional embodiments, along the direction perpendicular to the light-exiting surface S1 of the display panel, the geometric center of at least one second opening 32 may coincide with the geometric center of the corresponding first light-blocking strip 21. Along the direction perpendicular to the light-exiting surface S1 of the display panel, the geometric center of at least one first opening 22 may coincide with the geometric center of the corresponding second light-blocking strip 31. Therefore, when the user at the large-viewing-angle position on two sides of the display panel along the fifth direction W views the display panel, the interference of the large-viewing-angle light rays received from the anti-peep regions 12 may tend to be same, that is, the anti-peep effect may tend to be same.

Referring to FIG. 11, in some optional embodiments, the length of the first light-blocking strip 21 along the fifth direction W is a, the length of the first opening 22 along the fifth direction W is p, the length of the second opening 32 along the fifth direction W is b, and along the direction perpendicular to the light-exiting surface S1 of the display panel, the distance between the first light-blocking layer 20 and the second light-blocking layer 30 is h, where arctan$((p+(a-b)/2)/h) \leq 0.577$.

For example, in the first cross section, along the fifth direction W, the angle between the connecting line, which is between one side of the second light-blocking strip 31 and the side of the first opening 22 corresponding to the second light-blocking strip 31 that is away from the second light-blocking strip 31, and the direction perpendicular to the light-exiting surface S1 of the display panel is $\gamma$, where the first cross section may be in parallel with the fifth direction W, and the first cross section may be perpendicular to the direction of the light-exiting surface S1 of the display panel. The thickness of the first light-blocking layer 20 along the direction perpendicular to the light-exiting surface S1 of the display panel is relatively small and can be negligible, so that $\tan(\gamma)=(p+(a-b)/2)/h$, and arctan$((p+(a-b)/2)/h) \leq 0.577$, that is, $\gamma \leq 30°$.

When the display panel is a liquid crystal display panel, since the liquid crystal display panel is a non-self-emitting display panel, a backlight module BLU may be required to provide a light source. Refraction may occur when the non-front-viewing-angle light rays provided by the backlight module BLU are transmitted to the backlight surface S2 of the display panel. Exemplarily, the angle between the light ray C4 provided by the backlight module BLU and the direction perpendicular to the light-exiting surface S1 of the display panel is $\alpha$, the angle between the refracted direction of the light ray C4 transmitted to the backlight surface S2 of the display panel and the direction perpendicular to the light-exiting surface S1 of the display panel is $\beta$, $\alpha \leq 90°$, and $\beta \leq 41.8°$. To ensure that non-front-viewing-angle light rays provided by the backlight module BLU can pass the second opening 32 and the first opening 22 as possible and then exit from the light-exiting surface S1 of the display panel, $\gamma$ may need to be greater than or equal to 41.8°. Less light rays may exit from a viewing angle corresponding to a larger angle along the direction perpendicular to the light-exiting surface S1 of the display panel. When $\gamma$ is greater than or equal to 30°, the anti-peep effect formed by the first light-blocking layer 20 and the second light-blocking layer 30 may also be desirable, which may be beneficial for increasing the number of the first openings 22 in the first light-blocking layer 20.

Referring to FIG. 11, in some optional embodiments, $h \geq 1$ μm, which may be beneficial for the large-viewing-angle light rays passing the second opening 32 and the first opening 22 and exiting from the light-exiting surface S1 of the display panel. Therefore, when the user at the large-viewing-angle position views the display panel, the user may receive interference from the large-viewing-angle light rays from the anti-peep regions 12, which may effectively reduce the contrast ratio and realize the anti-peep effect.

In some optional embodiments, $h \leq 20$ μm. When the distance between the first light-blocking layer 20 and the second light-blocking layer 30 along the direction perpendicular to the light-exiting surface S1 of the display panel is greater than 20 μm, that is, along the direction perpendicular to the light-exiting surface S1 of the display panel, the thickness of the film layer disposed between the first light-blocking layer 20 and the second light-blocking layer 30 is relatively large, it may not be beneficial for reducing the production cost. In addition, when the first light-blocking layer 20 and the second light-blocking layer 30 are disposed on a same glass substrate and the film layer disposed between the first light-blocking layer 20 and the second light-blocking layer 30 is a photosensitive adhesive layer, relatively large thickness of the photosensitive adhesive layer may be likely to cause the glass substrate to warp, which may increase damage risk to glass substrates. Meanwhile, the thickness of the photosensitive adhesive layer is relatively large, it may easily cause image sticking when the display panel is in operation, thereby affecting the display effect of the display panel. Therefore, along the direction perpendicular to the light-exiting surface S1 of the display panel, the distance between the first light-blocking layer 20 and the second light-blocking layer 30 may be configured to be less than or equal to 20 μm, which may effectively solve the above-mentioned problem.

Obviously, in one embodiment, it may exemplarily illustrate that along the direction perpendicular to the light-exiting surface S1 of the display panel, the distance between the first light-blocking layer 20 and the second light-blocking layer 30 is greater than or equal to 1 μm, and less than or equal to 20 μm. In other embodiments of the present disclosure, along the direction perpendicular to the light-exiting surface S1 of the display panel, the distance between the first light-blocking layer 20 and the second light-blocking layer 30 may also be configured to other values according to actual production requirements, which may not be described in detail herein.

Referring to FIG. 11, in some optional embodiments, $a-b \geq 0.2$ μm. While ensuring that the first light-blocking strip 21 blocks the front-viewing-angle light rays, after passing the second opening 32, which cannot exit from the light-exiting surface S1 of the display panel, it may reduce the ambient light entering the internal of the display panel through the first opening 22 and the second opening 32.

Referring to FIG. 11, in some optional embodiments, the display panel may include the first substrate 50 and the second substrate 60 which are oppositely disposed.

The first substrate 50 and the second substrate 60 may need to be aligned and attached. One of the first light-blocking layer 20 and the second light-blocking layer 30 may be disposed on the first substrate 50, and the other may be disposed on the second substrate 60. When the first substrate 50 and the second substrate 60 need to be aligned and attached, it may result in alignment deviation of the first light-blocking layer 20 and the second light-blocking layer 30, which may affect the anti-peep effect of the display panel, and more seriously, may cause the front-viewingangle light rays to leak from the anti-peep regions 12, thereby affecting the normal display of the display panel.

Both the first light-blocking layer 20 and the second light-blocking layer 30 may be in the second substrate 60. That is, the first light-blocking layer 20 and the second light-blocking layer 30 may be formed in the second substrate 60. The alignment of the first light-blocking layer 20 and the second light-blocking layer 30 may not be affected by the alignment accuracy of the first substrate 50 and the second substrate 60. The alignment accuracy of the first light-blocking layer 20 and the second light-blocking layer 30 may be high, which may be beneficial for improving the anti-peep and display effect.

Figure 12:
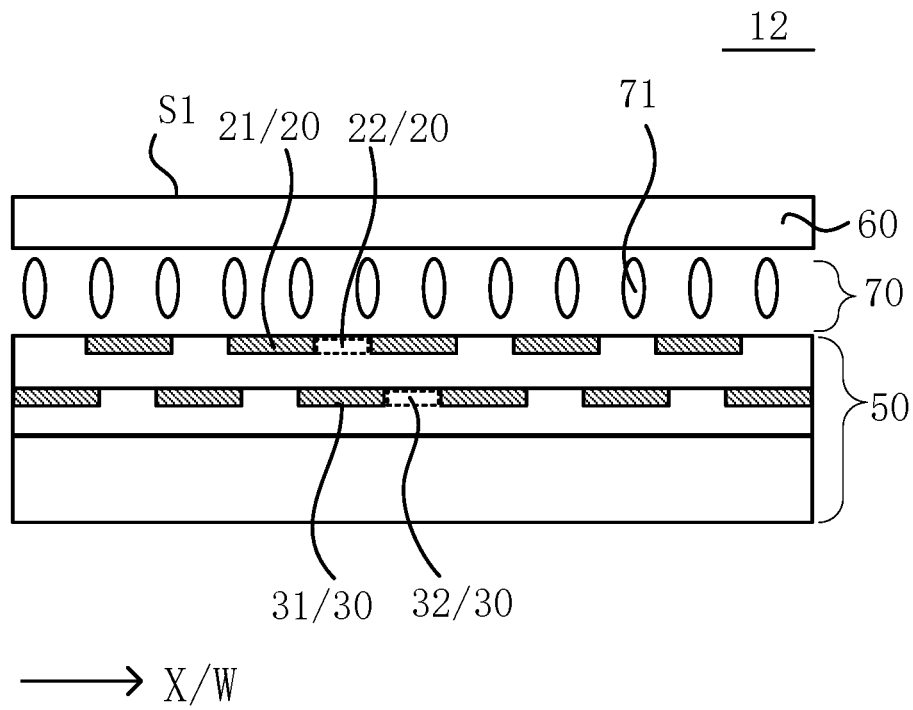
FIG. 12 illustrates a structural schematic of an anti-peep region in another pixel unit according to various embodiments of the present disclosure.

Similarly, referring to FIG. 12, FIG. 12 illustrates a structural schematic of an anti-peep region in another pixel unit according to various embodiments of the present disclosure. The display panel may include the first substrate 50 and the second substrate 60 that are oppositely disposed. Both the first light-blocking layer 20 and the second light-blocking layer 30 may in the first substrate 50. That is, the first light-blocking layer 20 and the second light-blocking layer 30 may be formed in the first substrate 50. The alignment and attachment of the first substrate 50 and the second substrate 60 may not affect the alignment accuracy of the first light-blocking layer 20 and the second light-blocking layer 30. The alignment accuracy of the first light-blocking layer 20 and the second light-blocking layer 30 may be high, which may be beneficial for improving the anti-peep and display effect.

It should be noted that both FIG. 11 and FIG. 12 may exemplarily illustrate that the display panel is a liquid crystal display panel. At this point, the first substrate 50 may be an array substrate, the second substrate 60 may be a color filter substrate, and a liquid crystal layer 70 may be further disposed between the first substrate 50 and the second substrate 60. Obviously, in other embodiments of the present disclosure, the display panel may also be an organic light-emitting display panel or other types of display panels; and the arrangement of the first light-blocking layer and the second light-blocking layer may refer to the arrangement of the first light-blocking layer and the second light-blocking layer in the above-mentioned embodiments, which may not be described in detail herein.

Figure 13:
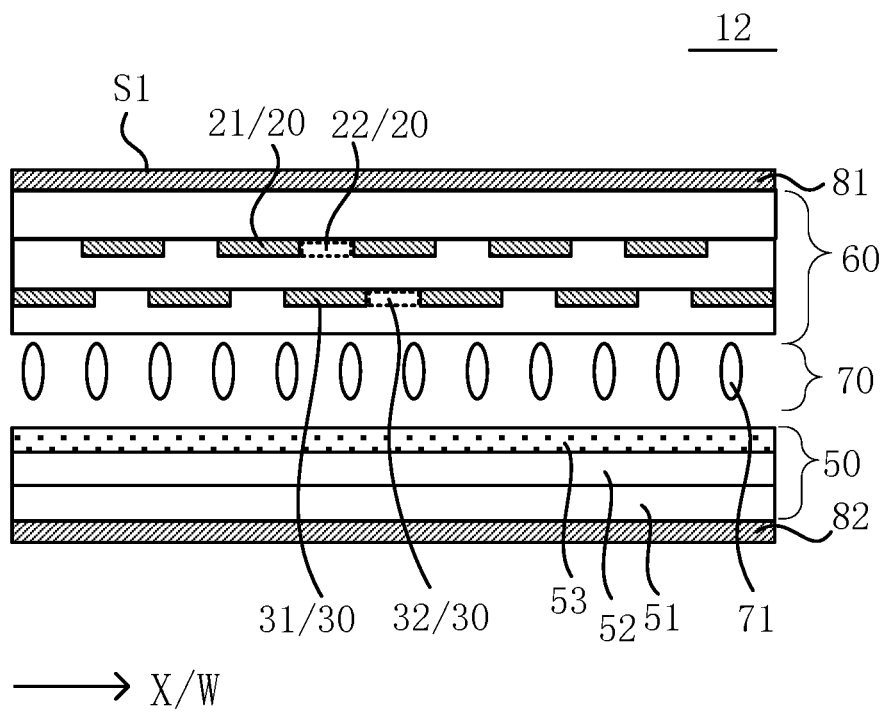
FIG. 13 illustrates a structural schematic of an anti-peep region in another pixel unit according to various embodiments of the present disclosure.

FIG. 13 illustrates a structural schematic of an anti-peep region in another pixel unit according to various embodiments of the present disclosure. Referring to FIG. 13, in some optional embodiments, the display panel may include a liquid crystal layer 70. The liquid crystal layer 70 may include liquid crystal molecules 71. The anti-peep region 12 may include liquid crystal molecules 71 and further include an anti-peep electrode 53. Optionally, the display panel may further include the array substrate 50 and the color filter substrate 60 which are disposed oppositely; the liquid crystal layer 70 may be disposed between the array substrate 50 and the color filter substrate 60; an upper polarizer 81 may be disposed on the side of the color filter substrate 60 away from the array substrate 50; a lower polarizer 82 may be disposed on the side of the array substrate 50 away from the color filter substrate 60; the upper polarizer 81 may be partially located in the anti-peep region 12; and the lower polarizer 82 may be partially located in the anti-peep region 12.

The display panel may include a normal display mode and an anti-peep display mode. In the normal display mode, an enable signal may not be provided to the anti-peep electrode 53, so that the liquid crystal molecules 71 in the anti-peep region 12 may not be deflected. No light may exit from the light-exiting surface S1 of the display panel in the anti-peep region 12, which may not affect the display effect when the user at the large-viewing-angle position views the display panel, such that the display panel may display normally under both the front viewing angle and the large viewing angle. In the anti-peep display mode, the enable signal may be provided to the anti-peep electrode 53, and an electric field may be formed between the anti-peep electrode 53 and the common electrode (not shown in FIG. 13) in the display panel, so that the liquid crystal molecules 71 in the anti-peep region 12 may be deflected. The front-viewing-angle light rays may be blocked by the first light-blocking layer 20 and the second light-blocking layer 30 and may not exit from the light-exiting surface S1 of the display panel, and a part of the large-viewing-angle light rays may pass the second opening 32 and the first opening 22 and exit from the light-exiting surface S1 of the display panel. That is, there are large-viewing-angle light rays in the anti-peep region 12 exiting from the light-exiting surface S1 of the display panel. Therefore, when the user at the large-viewing-angle position views the display panel, the user may receive interference from the large-viewing-angle light rays from the anti-peep region 12, which may effectively reduce the contrast ratio and realize the anti-peep effect. In one embodiment, the display panel may have the normal display mode and the anti-peep display mode by disposing the anti-peep electrode 53, and the switching between the normal display mode and the anti-peep display mode may be controlled by whether to provide the enable signal to the anti-peep electrode 53.

Optionally, the common electrode in the display panel may be disposed on a same layer as the anti-peep electrode 53; and the common electrode may also be disposed in a different layer from the anti-peep electrode 53. The common electrode may be disposed in the array substrate 50 or in the color filter substrate 60, which may not be limited in the present disclosure and may be determined based on actual requirements.

Optionally, the array substrate 50 may include a base substrate 51, and a circuit layer 52 located on the side of the base substrate 51 adjacent to the color filter substrate 60. The circuit layer 52 may include structures such as drive circuits. The anti-peep electrode 53 may be located on the side of the circuit layer 52 away from the base substrate 51. The drive circuit in the circuit layer 52 may provide the anti-peep electrode 53 with the enable signal.

Optionally, the anti-peep electrodes 53 of all anti-peep regions 12 in the display panel may be connected into an integrated structure to facilitate the switch to the anti-peep display mode.

Optionally, the anti-peep electrode 53 may be connected to a metal layer in the circuit layer 52 through a via, thereby reducing the resistance of the anti-peep electrode 53.

Referring to FIGS. 1 and 13, the display region 11 may include a pixel electrode (not shown in FIGS. 1 and 13), and the anti-peep electrode 53 may be disposed in a same layer as the pixel electrode. The anti-peep electrode 53 and the pixel electrode may be made of a same material in a same mask process, which may effectively reduce the formation process and reduces the production cost.

Figure 14:
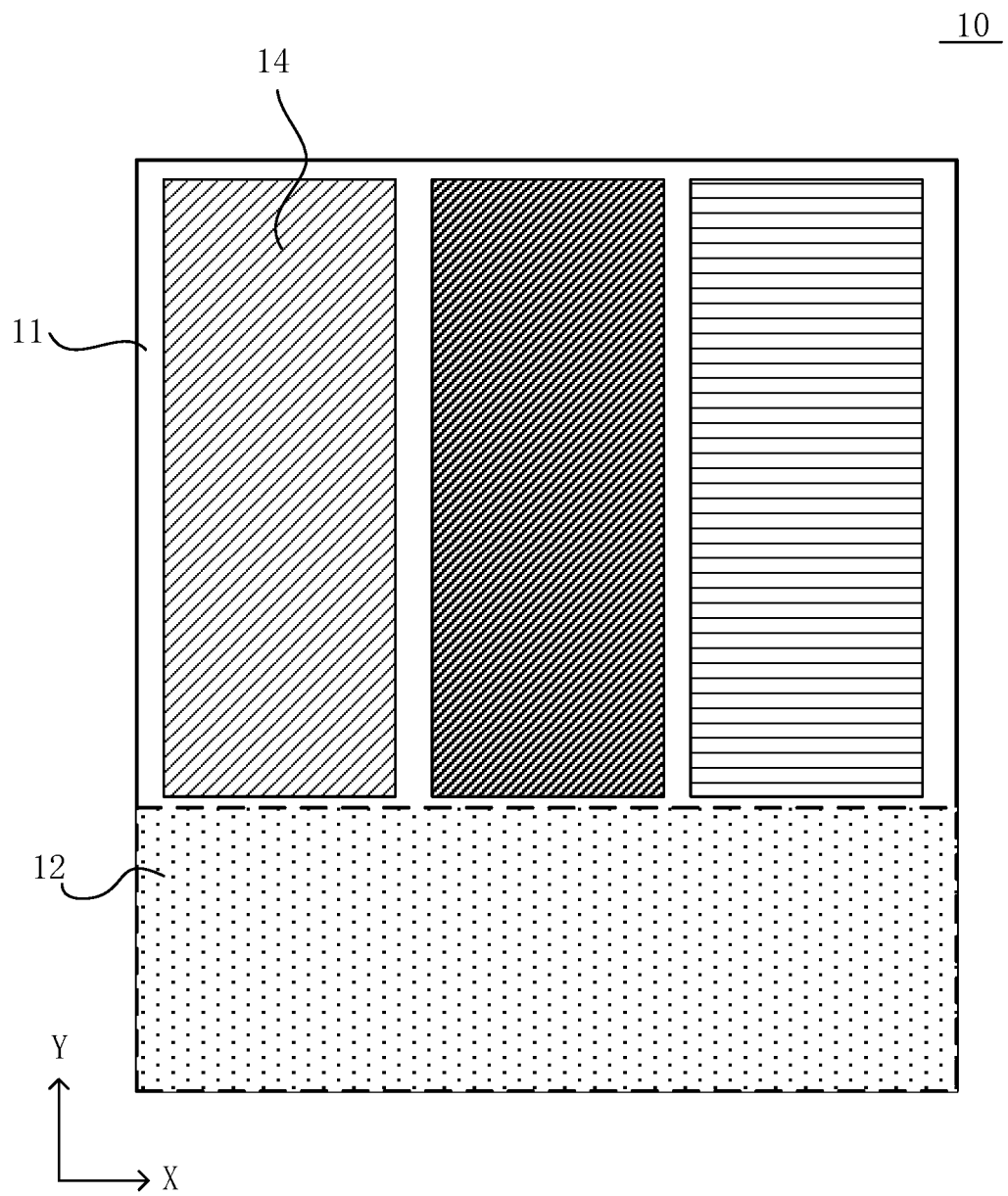
FIG. 14 illustrates a planar schematic of an exemplary pixel unit according to various embodiments of the present disclosure.

FIG. 14 illustrates a planar schematic of an exemplary pixel unit according to various embodiments of the present disclosure. Referring to FIG. 14, in some optional embodiments, the display region 11 may include at least two sub-pixels 14 arranged along the first direction X. Optionally, the display region 11 may include three sub-pixels 14 arranged along the first direction X, and the three sub-pixels 14 may be respectively a red sub-pixel, a blue sub-pixel and a green sub-pixel. Obviously, in other embodiments of the present disclosure, the display region 11 may also include other numbers of sub-pixels 14, which may not be described in detail herein.

Referring to FIG. 1, in at least one row of pixel units 10 arranged along the first direction X, the anti-peep regions 12 may be on a same side of the display regions 11 along the second direction Y. Therefore, in the pixel units 10 arranged along the first direction X, it may avoid that the anti-peep regions 12 may overlap the display regions 11 along the first direction X; and the light rays from the anti-peep regions 12 may be prevented from being transmitted to the display region 11 to cause light crosstalk problem, thereby affecting the normal display.

Optionally, in the display panel, along the second direction, one row of display regions 11 arranged along the first direction X and one row of anti-peep regions 12 arranged along the first direction X may be spaced apart from each other.

Figure 15:
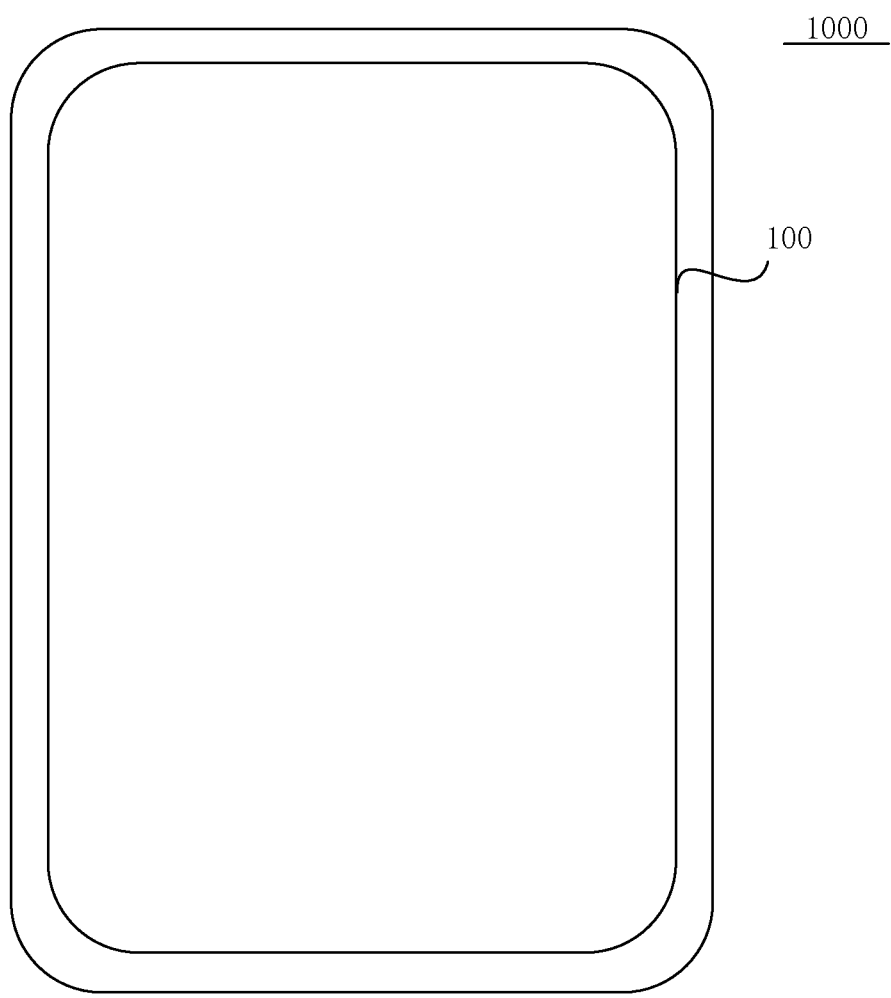
FIG. 15 illustrates a planar schematic of an exemplary display apparatus according to various embodiments of the present disclosure.

In some optional embodiments, referring to FIG. 15, FIG. 15 illustrates a planar schematic of an exemplary display apparatus according to various embodiments of the present disclosure. A display apparatus 1000 provided in one embodiment may include the display panel 100 provided by above-mentioned embodiments of the present disclosure. A mobile phone may be taken as an example to describe the display apparatus 1000 in FIG. 15. It can be understood that the display apparatus 1000 provided in embodiments of the present disclosure may also be a computer, a TV, a vehicle-mounted display device, and other display devices 1000 having a display function, which may not be limited according to various embodiments of the present disclosure. The display apparatus 1000 provided by embodiments of the present disclosure may have beneficial effects of the display panel 100 provided by embodiments of the present disclosure, which may refer to the description of the display panel in above-mentioned embodiments and may not be described in detail according to various embodiments of the present disclosure.

From the above-mentioned embodiments, it may be seen that the display panel and the display apparatus provided by the present disclosure may achieve at least the following beneficial effects.

In the display panel provided by embodiments of the present disclosure, at least one pixel unit may include the anti-peep region. The display panel may realize anti-peep effect by disposing the anti-peep region in the pixel unit. In the anti-peep region, when the front-viewing-angle light rays exit toward the side of the light-exiting surface of the display panel and pass the second light-blocking layer, a part of the front-viewing-angle light rays may be blocked by the second light-blocking strip and may not exit from the light-exiting surface of the display panel, and the remaining part of the front-viewing-angle light rays may pass the second opening and exit toward to the first light-blocking layer. Since the vertical projection of the second opening on the light-exiting surface of the display panel is within the vertical projection of the first light-blocking strip on the light-exiting surface of the display panel, the front-viewing-angle light rays after passing the second opening may be blocked by the first light-blocking strip and cannot exit from the light-exiting surface of the display panel. That is, due to the arrangement of the first light-blocking layer and the second light-blocking layer, the front-viewing-angle light rays may not exit from the light-exiting surface of the display panel. That is, the front-viewing-angle light rays may not be in the light rays exiting from the light-exiting surface of the display panel in the anti-peep region. Since the human eye normally views the display panel from the front view direction, the light rays exiting from the light-exiting surface of the display panel in the anti-peep region may not affect the normal display effect. In the anti-peep region, when the large-viewing-angle light rays exit toward the side of the light-exiting surface of the display panel and pass the second light-blocking layer, there may be a part of the large-viewing-angle light rays passing the second opening and exiting toward the first light-blocking layer. The distance between the first light-blocking layer and the second light-blocking layer along the direction perpendicular to the light-exiting surface of the display panel is greater than 0, and the first light-blocking layer includes at least one first opening. Therefore, there may be a part of the large-viewing-angle light rays passing the first opening and exiting from the light-exiting surface of the display panel. That is, through the arrangement of the first light-blocking layer and the second light-blocking layer, there may be a part of the large-viewing-angle light rays exiting from the light-exiting surface of the display panel. When the user at the large-viewing-angle position views the display panel, the user may receive interference from the large-viewing-angle light rays from the anti-peep region, which may effectively reduce the contrast ratio.

Although some embodiments of the present disclosure have been described in detail through examples, those skilled in the art should understand that the above-mentioned examples are provided for illustration only and not for the purpose of limiting the scope of the disclosure. Those skilled in the art should understand that modifications may be made to the above-mentioned embodiments without departing from the scope and spirit of the present disclosure. The scope of the present disclosure may be defined by appended claims.

What is claimed is:

1. A display panel, comprising:
   a plurality of pixel units, wherein:
     the plurality of pixel units are arranged in an array along a first direction and a second direction, the first direction intersecting with the second direction;
     at least one pixel unit includes a display region and an anti-peep region;
     the anti-peep region includes a first light-blocking layer and a second light-blocking layer; the first light-blocking layer is on a side of the second light-blocking layer facing a light-exiting surface of the display panel; and along a direction perpendicular to the light-exiting surface of the display panel, a distance between the first light-blocking layer and the second light-blocking layer is greater than zero;
     along a fifth direction, the first light-blocking layer includes a plurality of first light-blocking strips and a plurality of first openings, a first opening being arranged between two neighboring first light-blocking strips, and the fifth direction being parallel to the light-exiting surface of the display panel;
     along the fifth direction, the second light-blocking layer includes a plurality of second light-blocking strips and a plurality of second openings, a second opening being arranged between two neighboring second light-blocking strips; and
     a vertical projection of the second opening on the light-exiting surface of the display panel is within a vertical projection of a corresponding first light-blocking strip on the light-exiting surface of the display panel;

a vertical projection of the first opening on the light-exiting surface of the display panel is within a vertical projection of a corresponding second light-blocking strip on the light-exiting surface of the display panel;

at least one pixel unit of the plurality of pixel units includes a color anti-peep pixel which is in the anti-peep region and a color sub-pixel which is in the display region;

the color anti-peep pixel includes a first color-resist layer, and the color sub-pixel includes a second color-resist layer;

the first color-resist layer is partially in at least one of the first opening and the second opening;

at least of a part of the first color-resist layer is arranged in a same layer with the second color-resistlayer;

the display panel further comprising a plurality of pixel unit group columns, a pixel unit group column of the plurality of pixel unit group columns including a plurality of first pixel unit groups arranged along a third direction, the third direction intersecting with the first direction, and the third direction intersecting with the second direction; and a first pixel unit group of the plurality of first pixel unit groups includes M1×N1 pixel units; and in the first pixel unit group, all color anti-peep pixels are first-color anti-peep pixels, wherein M1 and N1 are both positive integers.

2. The display panel according to claim 1, wherein:
along a direction perpendicular to the light-exiting surface of the display panel, a geometric center of the second opening coincides with a geometric center of the corresponding first light-blocking strip; and
along the direction perpendicular to the light-exiting surface of the display panel, a geometric center of the first opening coincides with a geometric center of the corresponding second light-blocking strip.

3. The display panel according to claim 1, wherein:
the anti-peep region includes a light-emitting device.

4. The display panel according to claim 1, wherein:
the display panel includes a first substrate and a second substrate, which are oppositely disposed; and
both the first light-blocking layer and the second light-blocking layer are in the first substrate or in the second substrate.

5. The display panel according to claim 1, further comprising a liquid crystal layer including liquid crystal molecules, wherein:
the anti-peep region includes at least some liquid crystal molecules and an anti-peep electrode;
the display panel includes a normal display mode and an anti-peep display mode;
in the normal display mode, an enable signal is not provided to the anti-peep electrode; and
in the anti-peep display mode, the enable signal is provided to the anti-peep electrode.

6. The display panel according to claim 5, wherein:
the display region includes a pixel electrode, wherein the anti-peep electrode is disposed in a same layer as the pixel electrode.

7. The display panel according to claim 5, wherein:
a plurality of anti-peep electrodes are electrically connected.

8. The display panel according to claim 5, wherein:
the anti-peep electrode is electrically connected to a metal layer through a via.

9. The display panel according to claim 1, wherein:
the display region includes at least two sub-pixels arranged along the first direction;
in the pixel units with at least one row arranged along the first direction, the anti-peep region is on a same side of the display region along the second direction; and
the first direction is orthogonal with the second direction.

10. The display panel according to claim 1, wherein:
the plurality of first pixel unit groups are randomly distributed in the display panel.

11. The display panel according to claim 1, further comprising: at least one second pixel unit group; a second pixel unit group of the at least one second pixel unit group includes M2×N2 pixel units; and in the second pixel unit group, all color anti-peep pixels are second-color anti-peep pixels, wherein M2 and N2 are both positive integers, and the first color anti-peep pixel and the second color anti-peep pixel have different colors.

12. The display panel according to claim 11,
the display panel further comprising a plurality of second pixel unit group columns;
wherein:
a second pixel unit group column of the plurality of second pixel unit group columns includes a plurality of second pixel unit groups arranged along the third direction, and along a fourth direction, at least a part of the plurality of first pixel unit group columns and a part of the plurality of second pixel unit group columns are spaced apart from each other, and the fourth direction is perpendicular to the third direction.

13. The display panel according to claim 11, wherein:
the plurality of first pixel unit groups and the plurality of second pixel unit groups are randomly distributed in the display panel.

14. The display panel according to claim 11, further comprising: at least one third pixel unit group, wherein:
a third pixel unit group of the at least one third pixel unit group includes M3×N3 pixel units, in the third pixel unit group, all color anti-peep pixels are third-color anti-peep pixels, and M3 and N3 are both positive integers; and
the first-color anti-peep pixels, the second-color anti-peep pixels, and the third-color anti-peep pixels have different colors.

15. The display panel according to claim 14,
further comprising a plurality of second pixel unit group columns, and a plurality of third pixel unit group columns;
wherein a second pixel unit group column of the plurality of second pixel unit group columns includes a plurality of second pixel unit groups arranged along the third direction, and a third pixel unit group column of the plurality of third pixel unit group columns includes a plurality of third pixel unit groups arranged along the third direction; and
wherein along a fourth direction, at least two of the first pixel unit group column, the second pixel unit group column, and the third pixel unit group column are spaced apart from each other, and the fourth direction is perpendicular to the third direction.

16. The display panel according to claim 14, wherein:
the plurality of first pixel unit groups, the plurality of second pixel unit groups, and the third pixel unit groups are randomly distributed in the display panel.

17. The display panel according to claim 1, wherein a length of a first light-blocking strip along the fifth direction is a, a length of the first opening along the fifth direction is p, a length of the second opening along the fifth direction is b, and along a direction perpendicular to the light-exiting surface of the display panel, a distance between the first light-blocking layer and the second light-blocking layer is h, wherein $\arctan((p+(a-b)/2)/h) \geq 0.577$.

18. A display apparatus, comprising:
a display panel, comprising:
a plurality of pixel units, wherein:
the plurality of pixel units are arranged in an array along a first direction and a second direction, the first direction intersecting with the second direction;
at least one pixel unit includes a display region and an anti-peep region;
the anti-peep region includes a first light-blocking layer and a second light-blocking layer; the first light-blocking layer is on a side of the second light-blocking layer facing a light-exiting surface of the display panel; and along a direction perpendicular to the light-exiting surface of the display panel, a distance between the first light-blocking layer and the second light-blocking layer is greater than zero;
along a fifth direction, the first light-blocking layer includes a plurality of first light-blocking strips and a plurality of first openings, a first opening being arranged between two neighboring first light-blocking strips, and the fifth direction being parallel to the light-exiting surface of the display panel;
along the fifth direction, the second light-blocking layer includes a plurality of second light-blocking strips and a plurality of second openings, a second opening being arranged between two neighboring second light-blocking strips; and
a vertical projection of the second opening on the light-exiting surface of the display panel is within a vertical projection of a corresponding first light-blocking strip on the light-exiting surface of the display panel;
a vertical projection of the first opening on the light-exiting surface of the display panel is within a vertical projection of a corresponding second light-blocking strip on the light-exiting surface of the display panel; and
at least one pixel unit of the plurality of pixel units includes a color anti-peep pixel which is in the anti-peep region and a color sub-pixel which is in the display region;
the color anti-peep pixel includes a first color-resist layer, and the color sub-pixel includes a second color-resist layer;
the first color-resist layer is partially in at least one of the first opening and the second opening;
at least of a part of the first color-resist layer is arranged in a same layer with the second color-resist layer;
the display panel further comprising a plurality of pixel unit group columns, a pixel unit group column of the plurality of pixel unit group columns including a plurality of first pixel unit groups arranged along a third direction, the third direction intersecting with the first direction, and the third direction intersecting with the second direction; and
a first pixel unit group of the plurality of first pixel unit groups includes M1×N1 pixel units; and in the first pixel unit group, all color anti-peep pixels are first-color anti-peep pixels, wherein M1 and N1 are both positive integers.

* * * * *